United States Patent
Ding et al.

(10) Patent No.: US 12,229,280 B2
(45) Date of Patent: Feb. 18, 2025

(54) PRIVACY PRESERVING COOPERATIVE LEARNING IN UNTRUSTED ENVIRONMENTS

(71) Applicant: Accenture Global Solutions Limited, Dublin (IE)

(72) Inventors: Aolin Ding, Piscataway, NJ (US); Amin Hassanzadeh, Arlington, VA (US)

(73) Assignee: Accenture Global Solutions Limited, Dublin (IE)

( * ) Notice: Subject to any disclaimer, the term of this patent is extended or adjusted under 35 U.S.C. 154(b) by 456 days.

(21) Appl. No.: 17/695,820

(22) Filed: Mar. 15, 2022

(65) Prior Publication Data
US 2022/0300618 A1 Sep. 22, 2022

Related U.S. Application Data

(60) Provisional application No. 63/161,883, filed on Mar. 16, 2021.

(51) Int. Cl.
*G06F 21/60* (2013.01)
*G06N 3/045* (2023.01)
*G06N 3/08* (2023.01)

(52) U.S. Cl.
CPC ............ *G06F 21/60* (2013.01); *G06N 3/045* (2023.01); *G06N 3/08* (2013.01)

(58) Field of Classification Search
USPC ...................................... 726/22–26; 713/153
See application file for complete search history.

(56) References Cited

U.S. PATENT DOCUMENTS

| | | | | |
|---|---|---|---|---|
| 10,402,469 B2 * | 9/2019 | McMahan | ............... | G06F 17/17 |
| 11,038,891 B2 * | 6/2021 | Wu | ......... | H04L 9/006 |
| 11,087,234 B2 * | 8/2021 | Feng | ....... | H04L 41/16 |
| 11,106,804 B2 * | 8/2021 | Zhao | ...... | G06N 20/00 |
| 11,256,975 B2 * | 2/2022 | Dalli | ...... | G06N 5/045 |
| 11,449,805 B2 * | 9/2022 | Zheng | ..... | G06N 20/00 |
| 2015/0193695 A1 * | 7/2015 | Cruz Mota | ......... | H04L 63/1425 706/12 |
| 2015/0324686 A1 * | 11/2015 | Julian | ....... | G06N 3/08 706/25 |

(Continued)

*Primary Examiner* — Kambiz Zand
*Assistant Examiner* — Mahabub S Ahmed

(57) ABSTRACT

Aspects of the present disclosure provide systems, methods, and computer-readable storage media that support cooperative training of machine learning (ML) models that preserves privacy in untrusted environments. For example, a server (or cloud-based computing device(s)) may be configured to "split" an initial ML model into various partial ML models, some of which are provided to client devices for training based on client-specific data. Output data generated during the training at the client devices may be provided to the server for use in training corresponding server-side partial ML models. After training of the partial ML models is complete, the server may aggregate the trained partial ML models to construct an aggregate ML model for deployment to the client devices. Because the client data is not shared with other entities, privacy is maintained, and the splitting of the ML models enables offloading of computing resource-intensive training from client devices to the server.

20 Claims, 4 Drawing Sheets

(56) References Cited

U.S. PATENT DOCUMENTS

| | | | |
|---|---|---|---|
| 2016/0048766 A1* | 2/2016 | McMahon | G06Q 40/08 706/12 |
| 2016/0217387 A1* | 7/2016 | Okanohara | G06N 20/00 |
| 2017/0308802 A1* | 10/2017 | Ramsøy | G06N 20/00 |
| 2018/0018590 A1* | 1/2018 | Szeto | G16H 50/20 |
| 2018/0144244 A1* | 5/2018 | Masoud | G06N 3/105 |
| 2018/0367550 A1* | 12/2018 | Musuvathi | H04L 63/1425 |
| 2019/0042937 A1* | 2/2019 | Sheller | G06N 3/08 |
| 2019/0268163 A1* | 8/2019 | Nadeau | G06N 20/00 |
| 2019/0311298 A1* | 10/2019 | Kopp | G01C 25/00 |
| 2019/0318268 A1* | 10/2019 | Wang | H04L 67/1095 |
| 2019/0332955 A1* | 10/2019 | Manamohan | G06F 18/214 |
| 2019/0340534 A1* | 11/2019 | McMahan | G06F 17/18 |
| 2019/0362083 A1* | 11/2019 | Ortiz | H04L 9/321 |
| 2019/0385043 A1* | 12/2019 | Choudhary | G06F 13/4213 |
| 2020/0027022 A1* | 1/2020 | Jha | G06N 3/08 |
| 2020/0134508 A1* | 4/2020 | Cui | G06F 18/214 |
| 2020/0272945 A1* | 8/2020 | Manamohan | G06N 20/00 |
| 2020/0311583 A1* | 10/2020 | Manamohan | G06N 20/00 |
| 2020/0327250 A1* | 10/2020 | Wang | G06N 20/00 |
| 2020/0358599 A1* | 11/2020 | Baracaldo Angel | G06F 21/6227 |
| 2020/0364084 A1* | 11/2020 | Zheng | H04L 67/10 |
| 2020/0394518 A1* | 12/2020 | Sirdey | G06N 3/045 |
| 2020/0394552 A1* | 12/2020 | Ganapavarapu | H04L 9/50 |
| 2020/0401890 A1* | 12/2020 | Xu | H04L 9/50 |
| 2021/0004718 A1* | 1/2021 | Ren | H04L 9/0825 |
| 2021/0042628 A1* | 2/2021 | Zhou | G06N 3/044 |
| 2021/0073291 A1* | 3/2021 | Hunter | G06F 8/65 |
| 2021/0073678 A1* | 3/2021 | Chu | G06N 3/09 |
| 2021/0097381 A1* | 4/2021 | Daykin | G06F 11/3495 |
| 2021/0117780 A1* | 4/2021 | Malik | G06F 9/485 |
| 2021/0117788 A1* | 4/2021 | Muddle | H04L 9/30 |
| 2021/0125057 A1* | 4/2021 | Choi | G06N 3/04 |
| 2021/0143987 A1* | 5/2021 | Xu | H04L 9/0819 |
| 2021/0150037 A1* | 5/2021 | Radhakrishnan | G06N 20/00 |
| 2021/0150269 A1* | 5/2021 | Choudhury | G06V 30/1985 |
| 2021/0158099 A1* | 5/2021 | Tuor | G06N 3/049 |
| 2021/0174243 A1* | 6/2021 | Angel | H04L 9/083 |
| 2021/0174257 A1* | 6/2021 | Pothula | G06F 16/27 |
| 2021/0194703 A1* | 6/2021 | Queralt | H04L 63/0815 |
| 2021/0203565 A1* | 7/2021 | Arora | G06N 5/04 |
| 2021/0233192 A1* | 7/2021 | Manamohan | H04L 9/3236 |
| 2021/0234668 A1* | 7/2021 | Manamohan | H04L 9/0825 |
| 2021/0256429 A1* | 8/2021 | Gilbertson | G06N 3/08 |
| 2021/0299569 A1* | 9/2021 | Civin | G06N 3/08 |
| 2021/0304062 A1* | 9/2021 | Rajamoni | G06N 20/00 |
| 2021/0312334 A1* | 10/2021 | Liu | G06F 21/6254 |
| 2021/0312336 A1* | 10/2021 | Sinn | G06N 3/084 |
| 2021/0329522 A1* | 10/2021 | Li | G06N 5/04 |
| 2021/0357800 A1* | 11/2021 | Sharma | G06N 20/00 |
| 2021/0374608 A1* | 12/2021 | El-Khamy | G06N 20/20 |
| 2021/0398017 A1* | 12/2021 | Garg | H04L 9/50 |
| 2021/0406782 A1* | 12/2021 | Nakayama | G06F 16/27 |
| 2022/0012601 A1* | 1/2022 | Amad-Ud-Din | G06N 5/01 |
| 2022/0012637 A1* | 1/2022 | Rezazadegan Tavakoli | G06N 3/088 |
| 2022/0044162 A1* | 2/2022 | Zhang | G06F 21/64 |
| 2022/0060390 A1* | 2/2022 | Li | G06N 3/105 |
| 2022/0070668 A1* | 3/2022 | Henot | H04L 63/08 |
| 2022/0076169 A1* | 3/2022 | Wang | G06F 18/23 |
| 2022/0083906 A1* | 3/2022 | Ong | G06F 18/254 |
| 2022/0083916 A1* | 3/2022 | Khan | G06N 20/00 |
| 2022/0083917 A1* | 3/2022 | Ben-Itzhak | G06N 20/20 |
| 2022/0114475 A1* | 4/2022 | Zhu | G06N 3/084 |
| 2022/0123924 A1* | 4/2022 | Hoeppler | H04L 9/50 |
| 2022/0138603 A1* | 5/2022 | Tarumi | G06N 5/041 706/46 |
| 2022/0138626 A1* | 5/2022 | Bi | H04L 9/008 706/12 |
| 2022/0156368 A1* | 5/2022 | Spyridopoulos | G06N 3/08 |
| 2022/0156574 A1* | 5/2022 | Anwar | G06N 20/00 |
| 2022/0182802 A1* | 6/2022 | Pezeshki | H04W 72/21 |
| 2022/0198217 A1* | 6/2022 | Dong | G06F 18/2163 |
| 2022/0210140 A1* | 6/2022 | Dhunay | G06N 20/00 |
| 2022/0270590 A1* | 8/2022 | Beaufays | G06N 3/084 |
| 2022/0351860 A1* | 11/2022 | Aghaei | G16H 30/40 |
| 2022/0360539 A1* | 11/2022 | Chen | H04L 45/70 |
| 2022/0391771 A1* | 12/2022 | Huang | G06N 20/00 |
| 2022/0414237 A1* | 12/2022 | Lally | G06N 20/00 |
| 2022/0414464 A1* | 12/2022 | Krishnaswamy | G06N 3/047 |
| 2023/0008976 A1* | 1/2023 | Xu | H04L 9/3247 |
| 2023/0017542 A1* | 1/2023 | Khisti | H04L 9/085 |
| 2023/0028606 A1* | 1/2023 | Cheng | H04L 9/008 |
| 2023/0082173 A1* | 3/2023 | Li | G06N 3/045 713/168 |
| 2023/0153633 A1* | 5/2023 | Mohalik | G06N 20/00 706/25 |
| 2023/0169350 A1* | 6/2023 | Louizos | G06N 3/045 706/25 |
| 2023/0188319 A1* | 6/2023 | Froelicher | G06N 3/098 713/189 |
| 2023/0189319 A1* | 6/2023 | Akdeniz | G06N 3/084 370/329 |
| 2023/0232278 A1* | 7/2023 | Oh | H04W 72/04 370/329 |
| 2023/0237333 A1* | 7/2023 | Shao | G06V 10/762 706/25 |
| 2023/0252305 A1* | 8/2023 | Patil | G16H 50/20 706/12 |
| 2023/0289591 A1* | 9/2023 | Cyras | G06N 5/045 |
| 2023/0289615 A1* | 9/2023 | Vandikas | G06F 21/6254 |
| 2023/0316127 A1* | 10/2023 | Ward | H04L 9/008 706/12 |
| 2023/0316131 A1* | 10/2023 | Vandikas | H04W 24/02 706/12 |
| 2023/0319585 A1* | 10/2023 | Zhang | G06N 20/00 706/12 |
| 2023/0325529 A1* | 10/2023 | Sav | G06F 21/6245 726/26 |
| 2023/0325722 A1* | 10/2023 | Zhan | G06F 21/6245 706/12 |
| 2023/0328417 A1* | 10/2023 | Jumbe | H04W 12/06 600/301 |
| 2023/0328614 A1* | 10/2023 | Park | H04W 36/24 370/331 |
| 2023/0336436 A1* | 10/2023 | Zhang | H04L 41/082 |
| 2023/0342669 A1* | 10/2023 | Shao | H04L 9/008 |
| 2023/0385652 A1* | 11/2023 | Zhu | G06N 20/00 |
| 2023/0385688 A1* | 11/2023 | Sun | G06N 20/00 |
| 2023/0394320 A1* | 12/2023 | Anand | G06N 3/098 |
| 2023/0409962 A1* | 12/2023 | Butt | G06N 20/00 |
| 2024/0062072 A1* | 2/2024 | Wang | G06N 3/098 |

* cited by examiner

PRIVACY PRESERVING COOPERATIVE LEARNING IN UNTRUSTED ENVIRONMENTS

CROSS-REFERENCE TO RELATED APPLICATIONS

The present application claims the benefit of priority from U.S. Provisional Application No. 63/161,883 filed Mar. 16, 2021 and entitled "PRIVACY PRESERVING COOPERATIVE LEARNING IN UNTRUSTED ENVIRONMENTS," the disclosure of which is incorporated by reference herein in its entirety.

TECHNICAL FIELD

The present disclosure relates generally to systems and methods for leveraging cooperative or distributed machine learning and artificial intelligence that preserves privacy between different clients.

BACKGROUND

Machine learning (ML) and artificial intelligence (AI) are increasingly being leveraged in a variety of technologies to efficiently automate the performance of a variety of tasks. For example, computing devices have been configured to utilize ML and AI to forecast time series data, to identify and predict anomalies, to categorize digital images or video, to perform automatic speech recognition, to perform natural language processing, and the like. Coupled with the advance of deep learning (DL), a very noticeable trend is that ML models heavily rely on large-scale datasets and intensive computing resources. When facing distributed networks (e.g., edge devices) and highly sensitive datasets (e.g., finance, healthcare, etc.), conventional central-cloud ML infrastructures impose unique challenges due to their centralized system designs, posing challenges to deploy full state-of-the-art deep neural network (DNN) models as well as satisfy privacy preserving needs on a resource-constrained edge device. In order to configure ML models, such as neural networks (NNs), the ML models are designed to have an initial structure and then be trained, using training data, to perform a target task. Depending on the size and complexity of the ML model and the target task to be performed, such training can be significantly expensive in terms of computational resources. To support the use of ML techniques in less powerful devices, such as edge devices and/or some wireless devices (e.g., mobile phones, Internet of Things (IoT) devices, and like), training of ML models may be performed at a computing device with a large amount of computational resources, such as a server or one or more cloud-based processing devices. After an ML model is sufficiently trained and configured at a server, parameter values representing the trained ML model may be deployed to other devices for use by the other devices, which requires significantly fewer computing resources than training the ML model.

Although offloading the training of ML models from client devices reduces the amount of resources required at the client devices, this method of training ML models sacrifices the privacy of the data used in the training process. This may not be problematic if a single entity designs and trains an ML model using their own equipment and data, as information is not shared with other entities. However, an entity may be interested in designing and providing ML-based products for use by multiple different clients in one or more industries. In such cases, the entity that designs and creates an ML model requires training data to train the ML model. If the training data is based on confidential or private information of the clients, the clients may not be willing to share such data with the entity, especially if there is a risk the data may be accessible to the other clients (e.g., potential competitors).

These privacy concerns, as well as lack of scaling, lead to limited adoption of two techniques for distributed ML: split learning and federated learning. In split learning, an ML model that requires significant computational resources to train may be "split" into two partial ML models, one that is relatively small and less complex, and one that is larger and more complex. The less complex partial ML model may be trained at a client device using private data, and the output of this training may be provided to a server for use as training data for the more complex partial ML model at the server. Because the output data that is shared between the client device and the server is not the same as the private data, privacy for the client can be preserved in addition to offloading the more resource-intensive training to the server. Stated another way, split learning approaches split the learning model (e.g., neural networks) into two sub-models, and upload and train them correspondingly on the client and on the server side. Such design does not require these two entities to share model structures or parameters, with the advantages to protect the ML model from data leakage due to cyberattacks, such as model extraction attacks or membership inference attacks. However, split learning does not scale to multiple clients—for example, the resultant ML model from performing split learning with a first client is not trained on any data from a second client. Thus, the utility of the ML model for different clients may be limited. In federated learning, a server may send copies of the same ML model to multiple different clients, and each client may independently train their ML model using respective private client data. The trained ML models may be shared with the server such that the server generates an aggregated ML model that effectively has been trained using different client data. Stated another way, instead of pooling all datasets into a cloud server or data center, federated learning approaches train an individual ML model for each client on its local private data, and aggregate the updated models into a global model whose parameters will be distributed to all clients for the next round of local training. Although federated learning preserves privacy of the clients, as each client does not share any data with any other entity, federated learning does not address the problem of the significant resource requirements associated with training the ML models at the client devices. Thus, neither split learning nor federated learning offer a solution that can offload resource-intensive ML model training from client devices while maintaining privacy in an untrusted environment. Additionally, these techniques fail to address the key challenges of communication efficiency and client heterogeneity in more realistic settings with many clients where very unbalanced computing resources and data distributions may exist.

SUMMARY

Aspects of the present disclosure provide systems, methods, apparatus, and computer-readable storage media that support cooperative training of machine learning (ML) models that preserve privacy in an untrusted environment. For example, an untrusted environment may include multiple different entities, such as an entity that designs and deploys ML and artificial intelligence (AI)-based technology for use by multiple clients, such as different businesses in one or more industries, and the systems, devices, and techniques described herein enable the training of ML models that maintains privacy of client data. To illustrate, a server may obtain an initial ML model (e.g., a target ML model) based on one or more target operation(s) to be performed by the ML model, and the server may "split" the ML model into a respective client-side partial ML model and server-side ML model for each client. As a non-limiting example in which there are two clients, the server may generate a first set of parameters, a second set of parameters, a third set of parameters, and a fourth set of parameters based on the initial ML model, each of which correspond to a respective partial ML model. In this example, the server may split the initial ML model a first time, resulting in the first set of parameters that corresponds to a first partial ML model (e.g., a partial ML model to be trained at a first client device) and the third set of parameters that corresponds to a third partial ML model (e.g., a partial ML model to be trained at the server based on output from the training at the first client device). Additionally, the server may split the initial ML model a second time, resulting in the second set of parameters that corresponds to a second partial ML model (e.g., a partial ML model to be trained at a second client device) and the fourth set of parameters that corresponds to a fourth partial ML model (e.g., a partial ML model to be trained at the server based on output from the training at the second client device). Stated another way, the first partial ML model and the third partial ML model, if combined, construct the initial ML model, and the second partial ML model and the fourth partial ML model, if combined, also construct the initial ML model.

In some implementations, the server may split the initial ML model differently for different clients. To illustrate, in implementations in which the initial ML model is a neural network (NN) having multiple layers, the server may split the initial ML model such that a first subset of layers corresponds to the first partial ML model and a second subset of layers corresponds to the third partial ML model. The particular splitting performed by the server may be based on characteristics of the first client device and/or the first client, such as computing resources available at the first client device, size of a client dataset at the first client device, priority of the first client, or the like. As a non-limiting example, if the available computing resources at the first client device fail to satisfy a first threshold, the server may split the initial ML model such that the first partial ML model has relatively few layers and the third partial ML model has a greater number of layers. Additionally, the server may split the initial ML model such that a third subset of layers corresponds to the second partial ML model and a fourth subset of layers corresponds to the fourth partial ML model. The second splitting of the initial ML model may be different than the first splitting of the ML model, such that the first subset of layers (corresponding to the first partial ML model) includes a different number of layers than the third subset of layers (corresponding to the second partial ML model). For example, the third subset of layers may include more layers than the first subset of layers based on the second client device having a greater amount of available computing resources than the first client device. Although described in the context of numbers of layers of NNs, in other implementations, splitting the initial ML model may be performed in the context of any type of structural parameter for the initial ML model, and any such structural parameter values may be different between the first partial ML model and the second partial ML model, between the first partial ML model and the third partial ML model, and/or between the third partial ML model and the fourth partial ML model.

The server may provide the first partial ML model to the first client device for training, in addition to providing the second partial ML model to the second client device for training. Each client device may train the respective partial ML model using client data, which may be private, sensitive, confidential, or the like, as training data. Output data from training the partial ML models may be provided to the server for use in training the corresponding partial ML models at the server. To illustrate, the first client device may train the first partial ML model at the first client device using private client data, and during the training, first output data is generated. The first output data may include output of the first partial ML model, modifications to the first parameter set due to the training, other information generated during training, or the like, and the first client device may transmit the first output data to the server. The second client device may similarly train the second partial ML model using private client data at the second client device and transmit resulting second output data to the server. The server may use the first output data as training data for the third partial ML model (e.g., the partial ML model that is split from the first partial ML model), which results in the server modifying the third set of parameters that correspond to the third partial ML model. Similarly, the server may use the second output data as training data for the fourth partial ML model (e.g., the partial ML model that is split from the second partial ML model), which results in the server modifying the fourth set of parameters that correspond to the fourth partial ML model. In some implementations, the training may include the generation of gradient data at the server, such as during backpropagation, and the respective gradient data may be transmitted to the corresponding client device for further training of the respective client partial ML model, as further described herein. For example, training the third ML model at the server may generate first gradient data that is provided by the server to the first client device for use in training the first partial ML model, and training the fourth ML model at the server may generate second gradient data that is provided by the server to the second client device for use in training the second partial ML model.

After completion of the training, the server may aggregate the partial ML models to construct an aggregate ML model representing a fully-trained ML model that is trained based on the private client data of each of the client devices. In some implementations, aggregating the partial ML models may include averaging structural parameter values of the various partial ML models. For example, the server may average structural parameter values such as a number of layers, a number of nodes per layer, a number of connections per node, weights associated with connections, activation functions, or the like, between the third partial ML model and the fourth partial ML model as part of the aggregation. In some such implementations, the averaging may be based on weights assigned to the various partial ML models. For example, the server may assign different weights to partial ML models corresponding to different clients based on factors such as amount of client data used for training, processing resources of the client devices, size or complexity of the partial ML models, priority of the client, or other factors. If the partial ML models to be aggregated all have the same or similar structure, the averaging or weighted averaging may be performed on the modified parameter sets (e.g., indicating the trained partial ML models). If the partial ML models to be aggregated have different structures, the server may be configured to convert the partial ML models to a common format prior to aggregating. For example, the server may be configured to compress a partial ML model having more layers than another partial ML model to result in two ML models having the same number of layers (or other structural parameter value(s)). As another example, the server may extrapolate or predict values for one or more additional layers to add to one partial ML model to normalize the number of layers (or other structural parameter value(s)) with another partial ML model.

After constructing the aggregate ML model, the server may continue the above-described process until a target ML model is constructed. For example, if an accuracy of the aggregate ML model fails to satisfy a threshold, the server may split the aggregate ML model for providing partial ML models to the client devices, using the same splitting and training process described above. In some such implementations, the aggregate ML model may be split in the same way as the initial ML model is split, or the aggregate ML model (or a later iteration of an aggregate ML model) may be split differently (e.g., into partial ML models with different numbers of layers) during one or more additional iterations of the splitting and training process. When a final aggregate ML model is created, the server may deploy the final aggregate model to one or more client devices for use in performing a particular task. As a non-limiting example, the final aggregate model may be configured to receive input data indicating operational measurement data from a vehicle and to predict an operating mode or a failure condition at the vehicle. Additionally or alternatively, the server may store the final aggregate ML model for providing the particular task to clients based on input data received from the client devices.

In a particular aspect, a method for cooperative training of machine learning models includes generating, by one or more processors, a first parameter set corresponding to a first partial machine learning (ML) model, a second parameter set corresponding to a second partial ML model, a third parameter set corresponding to a third partial ML model, and a fourth parameter set corresponding to a fourth partial ML model. The first parameter set and the third parameter set correspond to a first splitting of an initial ML model design, and the second parameter set and the fourth parameter set correspond to a second splitting of the initial ML model design. The method also includes initiating, by the one or more processors, transmission of the first parameter set to a first client device and of the second parameter set to a second client device. The method includes modifying, by the one or more processors, the third parameter set based on first output data received from the first client device. The first output data represents output of a first trained ML model that is based on the first parameter set and trained using first client data. The method also includes modifying, by the one or more processors, the fourth parameter set based on second output data received from the second client device. The second output data represents output of a second trained ML model that is based on the second parameter set and trained using second client data. The method further includes aggregating, by the one or more processors, at least the modified third parameter set and the modified fourth parameter set to create an aggregate parameter set corresponding to an aggregate ML model.

In another particular aspect, a system for cooperative training of machine learning models includes a memory and one or more processors communicatively coupled to the memory. The one or more processors are configured to generate a first parameter set corresponding to a first partial ML model, a second parameter set corresponding to a second partial ML model, a third parameter set corresponding to a third partial ML model, and a fourth parameter set corresponding to a fourth partial ML model. The first parameter set and the third parameter set correspond to a first splitting of an initial ML model design, and the second parameter set and the fourth parameter set correspond to a second splitting of the initial ML model design. The one or more processors are also configured to initiate transmission of the first parameter set to a first client device and of the second parameter set to a second client device. The one or more processors are configured to modify the third parameter set based on first output data received from the first client device. The first output data represents output of a first trained ML model that is based on the first parameter set and trained using first client data. The one or more processors are also configured to modify the fourth parameter set based on second output data received from the second client device. The second output data represents output of a second trained ML model that is based on the second parameter set and trained using second client data. The one or more processors are further configured to aggregate at least the modified third parameter set and the modified fourth parameter set to create an aggregate parameter set corresponding to an aggregate ML model.

In another particular aspect, a non-transitory computer-readable storage medium stores instructions that, when executed by one or more processors, cause the one or more processors to perform operations for cooperative training of machine learning models. The operations include generating a first parameter set corresponding to a first partial ML model, a second parameter set corresponding to a second partial ML model, a third parameter set corresponding to a third partial ML model, and a fourth parameter set corresponding to a fourth partial ML model. The first parameter set and the third parameter set correspond to a first splitting of an initial ML model design, and the second parameter set and the fourth parameter set correspond to a second splitting of the initial ML model design. The operations also include initiating transmission of the first parameter set to a first client device and of the second parameter set to a second client device. The operations include modifying the third parameter set based on first output data received from the first client device. The first output data represents output of a first trained ML model that is based on the first parameter set and trained using first client data. The operations also include modifying the fourth parameter set based on second output data received from the second client device. The second output data represents output of a second trained ML model that is based on the second parameter set and trained using second client data. The operations further include aggregating at least the modified third parameter set and the modified fourth parameter set to create an aggregate parameter set corresponding to an aggregate ML model.

In another particular aspect, a method for cooperative training of machine learning models includes receiving, by one or more processors of a client device, a first parameter set from a server. The first parameter set corresponds to a first partial ML model having a different structure than one or more other partial ML models corresponding to one or more other client devices. The method also includes providing, by the one or more processors, private client data as training data to the first partial ML model. The method further includes initiating, by the one or more processors, transmission of ML output data to the server. The ML output data is generated by the first partial ML model during training.

In another particular aspect, a system for cooperative training of machine learning models includes a memory and one or more processors communicatively coupled to the memory. The one or more processors are configured to receive a first parameter set from a server at a client device. The first parameter set corresponds to a first partial ML model having a different structure than one or more other partial ML models corresponding to one or more other client devices. The one or more processors are also configured to provide private client data as training data to the first partial ML model. The one or more processors are further configured to initiate transmission of ML output data to the server. The ML output data is generated by the first partial ML model during training.

In another particular aspect, a non-transitory computer-readable storage medium stores instructions that, when executed by one or more processors, cause the one or more processors to perform operations for cooperative training of machine learning models. The operations include receiving a first parameter set from a server at a client device. The first parameter set corresponds to a first partial ML model having a different structure than one or more other partial ML models corresponding to one or more other client devices. The operations also include providing private client data as training data to the first partial ML model. The operations further include initiating transmission of ML output data to the server. The ML output data is generated by the first partial ML model during training.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

Figure 1:
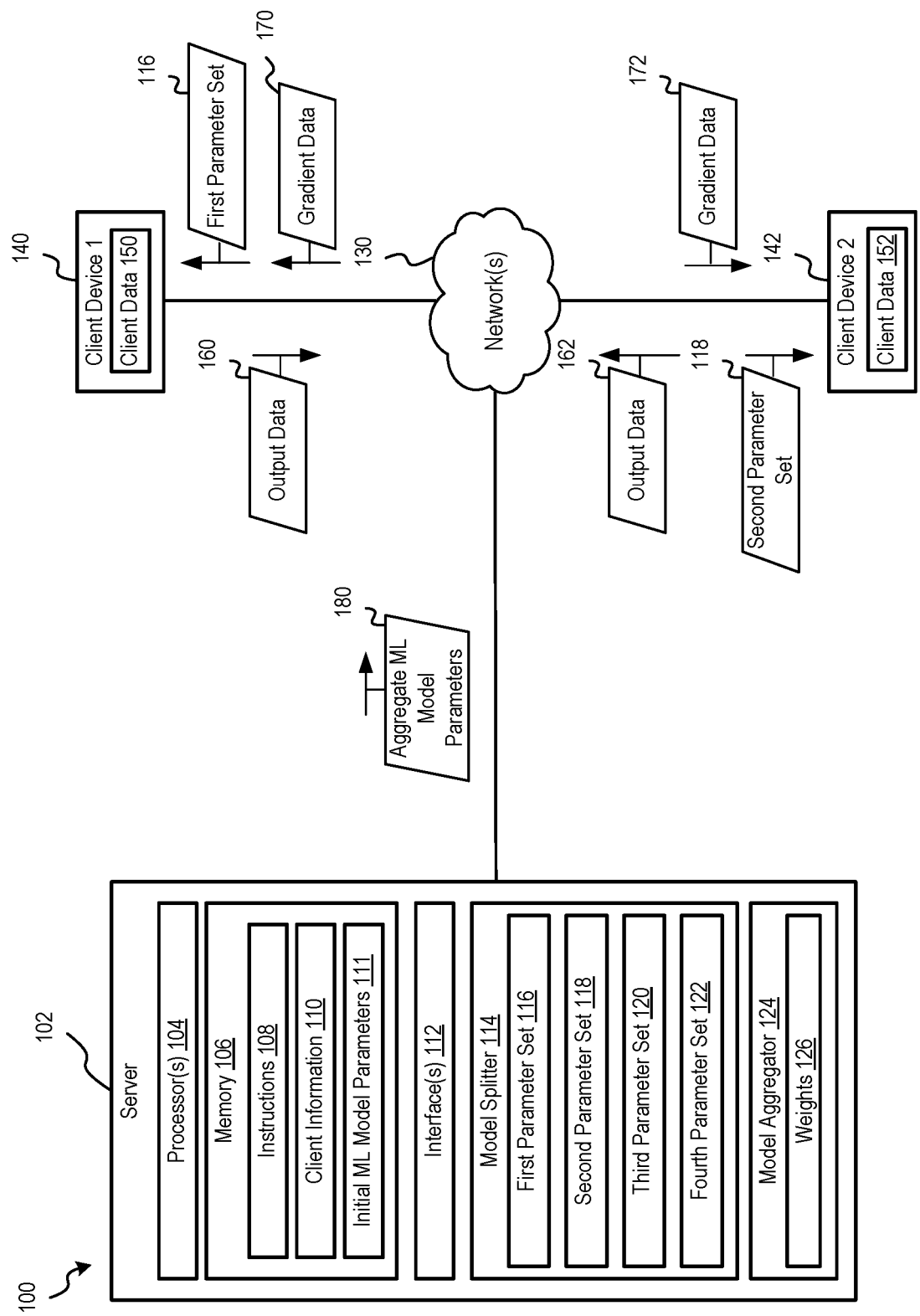
FIG. 1 is a block diagram of an example of a system that supports cooperative training of machine learning (ML) models that preserves privacy according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support cooperative training of machine learning (ML) models that preserves privacy in an untrusted environment. For example, a server (or other computing device, such as one or more cloud-based processing devices) may be configured to "split" an initial ML model into various partial ML models, some of which are trained by client devices of various clients that do not wish to share data. To illustrate, the clients may be potential competitors in a common industry, and the data used to train the partial ML models may represent private or proprietary data, such as measurement data associated with a product, image data that is not public, customer information, or other data that clients do not consent to sharing with potential competitors or others. The server may receive output data resulting from the training of partial ML models at the client devices for use in training partial ML models at the server, and the resulting trained partial ML models are aggregated to construct an aggregate ML model configured to perform one or more tasks. Because each client device trains a respective partial ML model at the client device, client data used to train the partial ML model is not shared with other clients or with the server, thereby maintaining privacy of the various clients. Additionally, the systems, devices, and techniques described herein provide a more flexible approach to cooperative ML training, because an initial ML model can be split in different ways (e.g., resulting in partial ML models having different structures) for different client devices, which may take advantage of differences in computing resources of the client devices or sizes of the client datasets, thereby resulting in improved accuracy in the final aggregate ML model while offloading computing resource-intensive training from client devices with relatively few computing resources.

The systems, methods, apparatus, and computer-readable storage media described herein may solve problems associated with either federated learning or split learning in untrusted environments, particularly ones with unbalanced computing resource access. Based on the characteristics of training data distribution, federated learning is intuitively categorized into three groups: horizontal federated learning, vertical federated learning, and federated transfer learning. While most federated learning frameworks work based on Stochastic Gradient Descent (SGD) optimization, some other methods propose modified versions of SGD to improve learning performance. In FedAvg, clients run local SGD for a predetermined number of epochs. For a modified version of FedAvg, LoAdaBoost, each client performs a certain number of epochs of training. After the certain number of epochs, if the local loss is higher than a threshold, the local epochs of training continue in order to decrease the local loss, otherwise the local training finishes. In another modification of FedAvg, the weights in FedAvg are modified based on the local loss of clients. The clients with lower local loss will have greater weights in FedAvg.

Unlike federated learning, split learning typically divides one complete network model into two sub-networks, then the client and the server commit and keep only one sub-network in the training, respectively. Split learning naturally distributes the model information (e.g., weights, bias, hyper-parameters) and training processes into two separate entities, which avoids raw data exchanges between client and server. One advantage of this methodology over federated learning is that it can flexibly adjust and limit the number of layers on the client side and complete the training of resource-intensive layers on the server side. Therefore, split learning addresses the trade-off between performance and resource efficiency in distributed machine learning methods like federated learning. Recent research into split learning has focused on addressing the computation and communication bottlenecks for edge devices by reducing model complexity (e.g., using tensor compression and feature compression), reducing communication costs between edge devices and the cloud, and accelerating inferences using adaptive network partitioning and workload balancing.

Additionally, research into split learning frameworks has exposed emergent threats in data privacy and information leakage. Depending on the victim that attackers exploit, privacy attacks on split learning can be categorized as model-oriented attacks, which aim to extract an equivalent model and duplicate the functionality of the ML model, or data-oriented attacks. Membership inference attacks aim at inferring whether a given individual sample is part of an ML model's training set. As an example, a classifier may be trained that distinguishes a target ML model's behaviors on training inputs from behaviors on non-training inputs. As opposed to information inferring from an individual input record, some other types of inference attacks, known as property inference attacks, show the privacy leakage of the total training set by comparing published statistics with a distribution of these statistics in the general population. Inference attacks have been demonstrated on ML classifiers and fully connected neural networks (NNs) using statistical information such as marginal distribution of feature values and the fraction of data that comes from a certain class. Model inversion attacks focus on learning sensitive genomic information and recovering the certain features of the input instance. For example, given a face recognition ML model and black-box access via an application programming interface (API), an adversary is able to recover recognizable images of victims' faces by only knowing their names. A generative adversarial network (GAN)-based attack against split learning may allow an adversary to exploit the learning process of a split ML model and generate prototypical samples of a private training set owned by a client. For data-oriented attacks on an edge-cloud collaborative inference setup, an attacker is capable of either querying the ML model and recovering the input samples from intermediate outputs or reconstructing the inference samples by leveraging maximum likelihood estimation with a shadow model. Compared with membership inference attacks, data reconstruction attacks aim at precisely recovering the training instances instead of inferring general property information. For example, an adversary may successfully reconstruct clients' private training sets with different capability settings such as knowledge of the client ML model (i.e., white box or black box), knowledge of the training set, and permission of the client ML model query. Assuming the attacker or an untrusted server may receive output data resulting from the training of partial ML models at the client devices, the attacker's goal is to leverage these intermediate values and further determine the optimal sample that is closest to the original input, which usually turns out to solve an optimization problem of minimizing the reconstruction error using regularized maximum Likelihood Estimation (rMLE) or mean squared error (MSE).

Research efforts have been made to reduce the privacy leakage of inference data in split learning through differential privacy, homomorphic encryption, and applying measurable privacy matrices. To illustrate, cryptographic frameworks may enable secure inference of ML models using secure 2-party computation with secure fixed-point arithmetic. Differential privacy has been proposed to protect the training data during model inference by adding random noise to the input. Another type of cryptographic technology, Secure Multi-Party Computation (MPC), refers to performing computation over data distributed between different parties and generating the output that is only revealed to the participants without sharing additional information. For untrusted participants in collaborative learning settings, homomorphic encryption may allow the ML model to perform inferences directly on encrypted data without decrypting or prior knowledge of a private key, which prevents sensitive information leakage but may suffer from the cost of significant communication and computation overhead due to its inefficiency. These state-of-the-art cryptography-based methods introduce extra communication cost and computation overhead, which may not be applicable for the realistic deployment scenarios where edge devices request fast responses with limited computational resources. Additionally, most measurable privacy matrices only focus on input data privacy in the ML model inference process, and not privacy of training data, output data, or the models themselves.

Returning to federated learning, in traditional federated learning, the goal is to solve the following standard formulation and minimize the overall population loss shown in Equation 1 below:

$$\min_{x \in R^d} f(x) = \frac{1}{n}\sum_{i=1}^{n} f_i(x_i) \text{ subject to } x_1 = x_2 = \ldots = x_n \quad \text{Equation 1}$$

where f represents the loss of the client i over its own local data. More specifically, the training algorithms, such as federated averaging, require all clients to have the same model structures and hence the models can be aggregated by directly averaging their model parameters. However, minimizing the aggregation of local function losses defined in Equation 1 cannot effectively adapt the model for each local client and performs poorly in unbalanced and non-independent and identically distributed (non-iid) local datasets. Moreover, integrating split learning techniques into cross-device federated learning scenarios is infeasible in practice because all participating clients share the same model structure and are not capable of customizing client-specific model splitting strategies based on local computing resources, which usually vary in hardware capacity and availability (e.g., when training on commodity mobile devices). Contrary to federated learning or split learning, the techniques described herein provide cooperative learning that outperforms federated learning and split learning with respect to heterogeneous client resources and unbalanced data distribution, including providing privacy protection and personalized client model splitting. For example, each client may have a personalized model structure for fast model training and deployment (e.g., updating the model based on newly added data samples) on resource-constrained devices where a full model is infeasible to be trained and deployed. The cooperative learning described herein is flexible and robust to the choice of neural network or other ML model typologies. Additionally, despite the diverse model partitioning strategies, improving privacy during the ML model training process also plays an important role in improving the robustness and effectiveness of the ML models described herein against input reconstruction attacks. To improve privacy in this manner, one or more aspects described herein integrate a distance correlation-based privacy matrix into model training for each specific partitioning strategy. For example, the system may automatically choose split points (e.g., automatically splits ML models) for ML models between edge devices and a server/the cloud that adapt to the edge devices' limited resources and achieve the best privacy preserving against inference attacks. Unlike conventional distance-correlation work, the distance correlation-based matrices described herein can be easily extended to different choices of neural network model typologies including both sequential and non-sequential models. To illustrate, without sacrificing accuracy of the ML model, aspects described herein may evaluate and determine the partition point of an ML model, such as a deep neural network (DNN), that achieves the best privacy preserving under the constraints of limited memory and computational resources for an edge device. In practical deployment, the techniques described herein may be adapted to various DNN architectures, application privacy requirements, and hardware platforms, allowing computation offloading to be combined with privacy protection.

Referring to FIG. 1, an example of a system that supports cooperative training of ML models that preserves privacy according to one or more aspects is shown as a system 100. The system 100 may be configured to train ML models across multiple devices, including client devices of multiple different clients, without sharing private client data between the multiple devices. As shown in FIG. 1, the system 100 includes a server 102, a first client device 140 ("Client Device 1"), a second client device 142 ("Client Device 2"), and one or more networks 130. In some implementations, the system 100 may include additional components, such as more than two client devices, as a non-limiting example.

The server 102 (e.g., a computing device configured to manage cooperative ML training) may include a single server or multiple servers communicatively coupled together to perform the operations described herein. In some other implementations, the server 102 may be replaced with one or more other computing devices, such as a desktop computing device, a laptop computing device, a personal computing device, a tablet computing device, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, one or more communication interfaces 112, a model splitter 114 (e.g., a model splitting module or model splitting instructions), and a model aggregator 124 (e.g., a model aggregating module or model aggregation instructions). In some other implementations, one or more of the components of the server 102 may be optional, one or more additional components may be included in the server 102, or both. It is noted that functionalities described with reference to the server 102 are provided for purposes of illustration, rather than by way of limitation and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 130. To illustrate, one or more operations described herein with reference to the server 102 may be performed by one or more processing devices in a cloud-based environment or a cloud-based system that communicates with one or more client or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data and information, such as client information 110 and initial ML model parameters 111. Illustrative aspects of the client information 110 and the initial ML model parameters 111 are described in more detail below.

The one or more communication interfaces 112 may be configured to communicatively couple the server 102 to the one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102.

The model splitter 114 is configured to "split" one or more ML models into multiple partial ML models. As used herein, "splitting" an ML model may refer to generating multiple parameter sets representing partial ML models based on a parameter set that represents a "complete" ML model. The various parameter sets include values of one or more structural parameters that represent configurations of respective ML models. In some implementations, the ML models include or correspond to one or more neural networks, such as multi-layer perceptron (MLP) networks, convolutional neural networks (CNNs), recurrent neural networks (RNNs), deep neural networks (DNNs), long short-term memory (LSTM) NNs, or the like, and the structural parameters may include a number of layers, a number of hidden layers, a number of nodes per layer or per type of layer, a number of input nodes, a number of output nodes, a number of hidden nodes, a number of connections per node, weights of connections, activation functions associated with nodes, or the like. The structural parameters may include one or more of what may be referred to in some ML literature as model parameters and/or hyperparameters. In other implementations, the ML models may be implemented as other types of ML models, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, or the like, with corresponding structural parameters.

To illustrate splitting of an ML model in implementations in which the ML model is an NN, the model splitter 114 may be configured to receive as input a parameter set that represents a structure of an initial ML model and to generate two (or more) parameter sets that each represent a respective partial ML model. For example, if the initial ML model includes an input layer, eight hidden layers, and an output layer, the model splitter 114 may generate a first parameter set that represents a first partial ML model having three layers (the input layer and the first two hidden layers). In this example, the model splitter 114 may also generate a second parameter set that represents a second partial ML model having seven layers (the remaining six hidden layers and the output layer). In such an example, the first parameter set and the second parameter set may be combined to construct the parameter set of the initial ML model, such that the first partial ML model having three layers and the second partial ML model having seven layers may be combined to reconstruct the initial ML model having ten total layers (e.g., the input layer, the eight hidden layers, and the output layer). In other implementations, the model splitter 114 may split ML models in other manners. The model splitter 114 may be configured to split an input ML model based on characteristics of a client device or client to which at least one of the partial ML models is to be provided for training, as further described herein. Additionally or alternatively, the model splitter 114 may be configured to perform privacy-aware model partitioning under resource constraints, as further described herein.

The model aggregator 124 is configured to aggregate multiple partial ML models to construct an aggregated ML model. For example, the model aggregator 124 may aggregate two partial ML models by generating an aggregated parameter set that indicates an aggregation of a first partial ML model and a second partial ML model. In some implementations, the model aggregator 124 may be configured to perform the aggregation by averaging structural parameter values of multiple partial ML models. For example, if a first partial ML model has four nodes per hidden layer and a second partial ML model has six nodes per hidden layer, the model aggregator 124 may average the number of hidden nodes per layer of the two partial ML models, resulting in an aggregate ML model having five nodes per hidden layer (i.e., (4+6)/2=5). In some other implementations, the model aggregator 124 may be configured to perform the aggregation by performing a weighted average of structural parameter values of multiple partial ML models. The weights of each partial ML model may be based on characteristics of the corresponding client device or client, such as an amount of available computing resources at the client device, a size of a client dataset, a priority of the client, or the like, as further described below.

In some implementations, each partial ML model to be aggregated has the same or similar structure, and the model aggregator 124 is configured to perform averaging, weighting averaging, or some other combination operation to aggregate the partial ML models. In some other implementations, some partial ML models to be aggregated may have sufficiently different structures such that averaging, or weighting averaging, may not be possible. In such implementations, the model aggregator 124 may be configured to convert the partial ML models to a common format prior to aggregating the partial ML models, as further described below.

The first client device 140 and the second client device 142 are configured to communicate with the server 102 via the one or more networks 130 to cooperatively train one or more ML models. The client devices 140 and 142 may include computing devices, such as desktop computing devices, laptop computing devices, personal computing devices, tablet computing devices, mobile devices (e.g., smart phones, tablets, PDAs, wearable devices, and the like), VR devices, AR devices, XR devices, vehicles (or component(s) thereof), entertainment systems, other computing devices, or a combination thereof, as non-limiting examples. Each of the client devices 140 and 142 may include a respective processor and a respective memory that stores instructions that, when executed by the processor, cause the processors to perform the operations described herein, similar to the server 102.

The client devices 140 and 142 may be owned, operated by, or otherwise associated with different clients of an entity associated with the server 102. For example, the server 102 may correspond to a third party that provides ML and AI-based technology and products to various entities to perform certain tasks, the first client device 140 may be associated with a first client (e.g., a first organization), and the second client device 142 may be associated with a second client (e.g., a second organization) that is different from the first client. Although two client devices 140 and 142 are depicted in FIG. 1, in other implementations, the system 100 may include more than two client devices that are associated with more than two distinct clients. The various clients may be in the same industry, or related industries. For example, the clients may include different airlines, different customers of a common organization, different network service providers, different original equipment manufacturers (OEMs), or the like.

Because the various clients may be competitors, or potential competitors, each client may desire to keep some or all client-specific data private, and thus the system 100 may represent an untrusted environment. However, the client-specific data may be required to train a more robust ML model for use by the various clients. To preserve privacy, the present disclosure provides techniques for cooperative training of ML models by the server 102, the first client device 140, and the second client device 142 that do not require client-specific data, which may be needed as training data, to be shared between the devices. For example, the first client device 140 may store (e.g., at a memory) or have access to first client data 150, the second client device 142 may store (e.g., at a memory) or have access to second client data 152, and cooperative training of ML models as described herein does not require the first client data 150 to be shared with the server 102 or the second client device 142, nor the second client data 152 to be shared with the server 102 or the first client device 140.

In some implementations, the server 102 may be deployed via cloud-based services to support communications with many different clients. Additionally or alternatively, the client devices 140 and 142 may be located at different locations, may be operated by different organizations, may be associated with different entities, or the like. The server 102 and the client devices 140 and 142 may communicate via simple network communications such as socket communications, HTTP, or the like.

During operation of the system 100, the server 102 may obtain the initial ML model parameters 111. For example, the server 102 may be configured to store (e.g., at the memory 106 or from a remote location such as a network database) one or more sets of parameters that represent one or more ML models designed to perform different actions, and the server 102 may select the initial ML model parameters 111 from the stored sets of parameters based on one or more particular actions to be performed. The server 102 may select the one or more particular actions based on user input indicating a selection, based on actions associated with clients for which ML model(s) are being trained, or in other manners. Alternatively, the server 102 may generate parameters for an initial ML model (e.g., the initial ML model parameters 111) based on one or more particular actions to be performed. The parameter generation may be automated or semi-automated (e.g., based at least partially on user input). The initial ML model parameters 111 may include structural parameter values (e.g., parameters and/or hyperparameters) that represent an initial ML model. For example, if the initial ML model is an NN, the initial ML model parameters 111 may include values of structural parameters such as an architecture type (e.g., MLP network, CNN, RNN, DNN, or the like), a number of layers, a number of hidden layers, a number of input nodes, a number of output nodes, a number of hidden nodes, a number of nodes per layer or per type of layer, a number of connections per node, or the like, and optionally other initial parameter values such as initial weights assigned to the various connections, activation functions, or the like. Although described in the context of NNs, in other implementations, the ML models may be other types of ML models, and the parameters may include parameters associated with the other types of ML models.

After obtaining the initial ML model parameters 111, the server 102 (e.g., the processor 104) may provide the initial ML model parameters 111 as input to the model splitter 114. The model splitter 114 may split the initial ML model parameters 111 into multiple subsets of parameters that represent multiple partial ML models. In some implementations, the model splitter 114 may split the initial ML model parameters 111 into two subsets of parameters for each client: a client-side subset of parameters and a server-side subset of parameters. In the example shown in FIG. 1 in which there are two clients (e.g., two client devices), the model splitter 114 performs two splitting operations: a first splitting operation associated with the first client that generates a first parameter set 116 and a third parameter set 120, and a second splitting operation associated with the second client that generates a second parameter set 118 and a fourth parameter set 122. In such an example, the first parameter set 116 represents a first partial ML model (a first client-side partial ML model) to be trained at the first client device 140, the second parameter set 118 represents a second partial ML model (a second client-side partial ML model) to be trained at the second client device 142, the third parameter set 120 represents a third partial ML model (a first server-side partial ML model) to be trained at the server 102 and that is associated with the first partial ML model, and the fourth parameter set 122 represents a fourth partial ML model (a second server-side partial ML model) to be trained at the server 102 and that is associated with the second partial ML model.

The model splitter 114 may split the initial ML model such that the client-side partial ML models and the server-side partial ML models have substantially the same structure. For example, if the initial ML model has an even number of layers, the client-side partial ML models and the server-side partial ML models may have the same number of layers (e.g., half the number of layers of the initial ML model). If the initial ML model has an odd number of layers, either the client-side partial ML models or the server-side partial ML models may have one more layer than the other of the client-side partial ML models or the server-side partial ML models. Alternatively, the model splitter 114 may split the initial ML model such that the client-side partial ML models have different structure than the server-side partial ML models. For example, the server-side partial ML models may have more layers than the client-side ML models. Specific examples of splitting ML models into partial ML models are described herein with reference to FIG. 2. The model splitter 114 may determine how to split the initial ML model parameters 111 (e.g., the sizes of the parameter sets for the client devices and the server 102) based on factors indicated by the client information 110.

To illustrate splitting the initial ML model, the client information 110 may indicate relevant characteristics of the clients or the client devices 140 and 142, such as computing resources available at the client devices 140 and 142, relative sizes of the client-specific data (e.g., the first client data 150 and the second client data 152) accessible to the client devices 140 and 142, priorities associated with the clients, other client or client device characteristics, or a combination thereof, and the model splitter 114 may determine the splitting to perform on the initial ML model parameters 111 based on the characteristics in order improve or optimize the robustness of resultant aggregate ML model(s) and the use of available computing resources at the server 102 and the client devices 140 and 142. For example, the model splitter 114 may cause the server-side partial ML model parameters to have a relatively large number of parameters based on client-side computing resources failing to satisfy a first threshold, as compared to causing the server-side partial ML model parameters to have fewer parameters based on the client-side computing resources satisfying the first threshold. As another example, the model splitter 114 may cause the server-side partial ML model parameters to have a relatively large number of parameters based on the relative size of the client-specific data failing to satisfy a second threshold, as compared to causing the server-side partial ML model parameters to have fewer parameters based on the relative size satisfying the second threshold. It will be appreciated that the split between client-side partial ML models and server-side partial ML models may be similarly based on any desired characteristic or information included in the client information 110.

In some implementations, the model splitter 114 may perform the same split on the initial ML model parameters 111 for each client. For example, the model splitter 114 may split the initial ML model parameters 111 so that the first partial ML model (corresponding to the first parameter set 116) and the second partial ML model (corresponding to the second parameter set 118) each have the same or similar structure. Additionally, the third partial ML model (corresponding to the third parameter set 120) and the fourth partial ML model (corresponding to the fourth parameter set 122) may each have the same or similar structure. Performing the same split between client-side and server-side partial ML models for each client may be faster and less complex than performing individual, client-specific splits of the initial ML model parameters 111. Alternatively, the model splitter 114 may perform different splits of the initial ML model parameters 111 (e.g., the initial ML model) between client-side and server-side for each client (or for some clients). For example, the model splitter 114 may split the initial ML model parameters 111 differently for the first client than for the second client, such that the first partial ML model (corresponding to the first parameter set 116) has a different structure than the second partial ML model (corresponding to the second parameter set 118). Additionally, a structure of the third partial ML model (corresponding to the third parameter set 120) may be different than a structure of the fourth partial ML model (corresponding to the fourth parameter set 122). In some implementations, the model splitter 114 may determine how to split the initial ML model parameters 111 for each client based on client-specific information indicated by the client information 110, such as processing resources available at the respective client device, relative size of the respective client dataset, priority of the respective client, or the like, as described above. Performing individual splits on a client-by-client basis is more flexible and may improve the robustness of a resulting trained ML model as well as improve computing resource utilization across the server 102, the first client device 140, and the second client device 142 as compared to performing the same split for all clients. Specific examples of splitting ML models into different partial ML models for different clients are described herein with reference to FIG. 2.

After splitting the initial ML model parameters 111 into the parameter sets 116-122, the server 102 may provide parameter sets associated with partial ML models to the client devices. For example, the server 102 may transmit the first parameter set 116 to the first client device 140 in addition to transmitting the second parameter set 118 to the second client device 142. The client devices 140 and 142 may implement respective partial ML models based on the received parameter sets and train the respective partial ML models based on client-specific data. For example, the first client device 140 may implement the first partial ML model based on the first parameter set 116, and the first client device 140 may train the first partial ML model by providing the first client data 150 as training data to the first partial ML model. Training of the first partial ML model may cause generation, by the first client device 140, of first output data 160. The first output data 160 may include outputs of last layer of the first partial ML model, weights of connections between nodes of the first partial ML model, modifications to first parameter set 116, or any other data generated during or resulting from training of the first partial ML model. Output data from training ML models may also be referred to as "smash" data. The first client device 140 may transmit the first output data 160 to the server 102 for use in training the corresponding server-side partial ML model. For example, the server 102 may implement the third partial ML model based on the third parameter set 120, and the server 102 may provide the first output data 160 as training data to the third partial ML model. In some implementations, the training of the third partial ML model includes back propagation using gradient data. For example, first gradient data 170 may be generated during or resulting from a forward-portion of training, and the first gradient data 170 may be back-propagated through the third partial ML model as part of the training. Additionally, after backpropagation through the third partial ML model (and any updates to the first gradient data 170 therefrom), the server 102 may transmit the first gradient data 170 to the first client device 140. The first client device 140 may use the first gradient data 170 for backpropagation through the first partial ML model to further train (or complete training or part of the training of) the first partial ML model. Any additional output data generated during this training may be provided to the server 102 for use in further training the third partial ML model. In some implementations, any output data and gradient data shared between the server and the first client device 140 may be encrypted. This process of sharing output data and gradient data between the server 102 and the first client device 140 may continue until the first partial ML model and the third partial ML model are trained (e.g., to a particular accuracy score, for a particular amount of time, or the like). Completion of the training of the first partial ML model and the third partial ML model results in modification of the first parameter set 116, the third parameter set 120, or both, at the server 102, to account for changes to the partial ML models due to the training.

Similar operations may be performed at the second client device 142. For example, the second client device 142 may implement the second partial ML model based on the second parameter set 118, and the second client device 142 may train the second partial ML model by providing the second client data 152 as training data to the second partial ML model. Training of the second partial ML model may cause generation, by the second client device 142, of second output data 162. The second output data 162 (e.g., second smash data) may include outputs of the last layer of the second partial ML model, weights of connections between nodes of the second partial ML model, modifications to second parameter set 118, or any other data generated during or resulting from training of the second partial ML model. The second client device 142 may transmit the second output data 162 to the server 102 for use in training the corresponding server-side partial ML model. For example, the server 102 may implement the fourth partial ML model based on the fourth parameter set 122, and the server 102 may provide the second output data 162 as training data to the fourth partial ML model. In some implementations, the training of the fourth partial ML model includes back propagation using gradient data. For example, second gradient data 172 may be generated during or resulting from a forward-portion of training, and the second gradient data 172 may be back-propagated through the fourth partial ML model as part of the training. Additionally, after backpropagation through the fourth partial ML model (and any updates to the second gradient data 172 therefrom), the server 102 may transmit the second gradient data 172 to the second client device 142. The second client device 142 may use the second gradient data 172 for backpropagation through the second partial ML model to further train (or complete training or part of the training of) the second partial ML model. Any additional output data generated during this training may be provided to the server 102 for use in further training the fourth partial ML model. In some implementations, any output data and gradient data shared between the server and the second client device 142 may be encrypted. This process of sharing output data and gradient data between the server 102 and the first client device 140 may continue until the first partial ML model and the third partial ML model are trained (e.g., to a particular accuracy score, for a particular amount of time, or the like). Completion of the training of the second partial ML model and the fourth partial ML model results in modification of the second parameter set 118, the fourth parameter set 122, or both, at the server 102, to account for changes to the partial ML models due to the training.

After training of the partial ML models is complete, the model aggregator 124 may aggregate related partial ML models to construct an aggregate ML model (e.g., the modified parameters sets may be aggregated to construct aggregate ML model parameters 180). In some implementations, the model aggregator 124 may separately aggregate the server-side partial ML models and the client-side partial ML models prior to combining the aggregated server-side partial ML model and the aggregated client-side partial ML model (as described above) to construct the aggregate ML model (corresponding to the aggregate ML model parameters 180). For example, the model aggregator 124 may aggregate the modified first parameter set 116 (corresponding to the first partial ML model) and the modified second parameter set 118 (corresponding to the second partial ML model) to construct a first partial parameter set, and the model aggregator 124 may aggregate the modified third parameter set 120 (corresponding to the third partial ML model) and the modified fourth parameter set 122 (corresponding to the fourth partial ML model) to construct a second partial parameter set. In this example, the model aggregator 124 may combine the first partial parameter set and the second partial parameter set to construct the aggregate ML model parameters 180. Alternatively, the model aggregator 124 may combine each client-side partial ML model with the corresponding server-side partial ML model prior to aggregating the resulting ML models to construct the aggregate ML model. For example, the model aggregator 124 may combine the first parameter set 116 and the third parameter set 120 to construct a first model parameter set, and the model aggregator 124 may combine the second parameter set 118 and the fourth parameter set 122 to construct a second model parameter set. In this example, the model aggregator 124 may aggregate the first model parameter set and the second model parameter set to construct the aggregate ML model parameters 180.

In some implementations, aggregating may include averaging corresponding structural parameter values from different parameter sets (corresponding to different ML models). For example, the model aggregator 124 may aggregate the first parameter set 116 and the second parameter set 118 by determining an average value of various structural parameters between the first parameter set 116 and the second parameter set 118, such as an average number of hidden layers, an average number of output nodes, an average weight for one or more connections between nodes, or the like. The model aggregator 124 may aggregate the various parameter sets (corresponding to the various ML models) serially or in parallel (e.g., concurrently). Additionally or alternatively, the model aggregator 124 may initiate aggregation responsive to receiving the entirety of output data from the first client device 140 and the second client device 142 and completing training of the partial ML models, responsive to completing training of a threshold number of partial ML models, responsive to a threshold amount of time elapsing, or responsive to other situations.

In some other implementations, aggregating may include performing a weighted average of the structural parameter values. To illustrate, the model aggregator 124 may assign weights 126 to the various parameter sets (corresponding to the various partial ML models) prior to averaging the weighted structural parameter values, as described above. The model aggregator 124 may assign the weights 126 that may be based on the client information 110, similar to the model splitter 114 determining how to split the initial ML model parameters 111 based on the client information 110. As an example, if the first client device 140 has significantly fewer available computer resources than the second client device 142, the model aggregator 124 may assign a relatively low weight to the modified first parameter set 116 and a relatively high weight to the modified second parameter set 118, such as a first weight of 0.3 and a second weight of 0.7, respectively. As another example, if the first client data 150 has significantly larger relative size than the second client data 152, the model aggregator 124 may assign a relatively high weight to the modified first parameter set 116 and a relatively low weight to the modified second parameter set 118, such as a first weight of 0.8 and a second weight of 0.2, respectively. As yet another example, if the first client has lower priority than the second client, the model aggregator 124 may assign a relatively low weight to the modified first parameter set 116 and a relatively high weight to the modified second parameter set 118, such as a first weight of 0.5 and a second weight of 0.6, respectively. Similar weights may be assigned to the modified third parameter set 120 and the modified fourth parameter set 122. It will be appreciated that the weights assigned to the various parameter sets (e.g., the various ML models) may be similarly based on any desired characteristic or information included in the client information 110. After assigning the weights 126, the model aggregator 124 may perform a weighted average of the structural parameter values to construct the aggregate ML model parameters 180.

In some implementations, the ML models to be aggregated have same structure, such as the corresponding parameter sets having the same number and order of parameters, and the model aggregator 124 may aggregate (e.g., average, weighted average, or another aggregation/combination operation) on a parameter-by-parameter basis for an entirety, or a selected subset, of the parameter sets being aggregated. In some other implementations, the ML models to be aggregated have different structures, such as the corresponding parameter sets having different amounts of parameters, and the model aggregator 124 may convert the ML models to a common format prior to performing the aggregation. In some implementations, the model aggregator 124 may convert ML models to a common format by compressing ML models having a larger size or more detailed structure (e.g., parameter sets including more parameters) to the same size or structure (e.g., the same number of parameters) as an ML model with the smallest size or least-detailed structure (e.g., the fewest parameters) or some predefined format. For example, if one ML model has six hidden layers and another ML model has five hidden layers, one hidden layer may be pruned (or two hidden layers may be merged) such that both ML models have five hidden layers. As another example, if one ML model has a layer with four nodes and another ML model has a layer with three nodes, one node may be pruned (or two nodes may be merged) such that both ML models have layers with three nodes. In some other implementations, the model aggregator 124 may extrapolate to expand ML models with smaller sizes or less detailed structures to convert the ML models to a larger size or more detailed common format. After converting the various ML models to the common format, the model aggregator 124 may aggregate the ML models as described above.

In some implementations, the splitting, training, and aggregating are repeated for multiple iterations or epochs. To illustrate, after the model aggregator 124 constructs the aggregate ML model parameters 180, the model splitter 114 may split the aggregate ML model parameters 180 into client-side and server-side parameter sets. The server 102 may provide the parameter sets that represent client-side partial ML models to the client devices 140 and 142 while retaining the parameter sets that represent the server-side partial ML models at the server 102, and the training and aggregation process may be repeated. In some implementations, the model splitter 114 may perform the same splitting on the aggregate ML model parameters 180 as performed on the initial ML model parameters 111, such that the size and structure of the partial ML models created from splitting the aggregate ML model parameters 180 are the same as the size and structure of the partial ML models created from splitting the initial ML model parameters 111. In some other implementations, the model splitter 114 may perform different splits during different iterations or epochs. For example, the size and structure of the partial ML models created from splitting the aggregate ML model parameters 180 may be different than the size and structure of the partial ML models created from splitting the initial ML model parameters 111. The splitting, training, and aggregating process may continue until the resulting aggregate ML model satisfies an accuracy threshold, until a threshold time period has lapsed, or based on some other constraint.

After the training process is complete and the aggregate ML model parameters 180 are finalized, the server 102 may deploy the aggregate ML model to one or more client devices. For example, the server 102 may transmit the aggregate ML model parameters 180 to the first client device 140, the second client device 142, and/or any other client device for implementing a robust ML model for use in performing one or more actions. For example, the aggregate ML model implemented based on the aggregate ML model parameters 180 may be configured to predict repair conditions for engines based on input engine operation measurements. As another example, the aggregate ML model implemented based on the aggregate ML model parameters 180 may be configured to predict network bottlenecks based on real-time network operating data. It will be appreciated that many different types of ML models may be configured according to the techniques described herein, including MLP networks for data compression or encryption, CNNs for computer vision and image categorization, RNNs for time series forecasting or anomaly detection, or the like. Additionally or alternatively, the server 102 may implement an ML model based on the aggregate ML model parameters 180 to provide similar actions at the server 102.

As described above, the system 100 supports cooperative training of ML models that efficiently uses available computing resources at the server 102, the first client device 140, and the second client device 142 while preserving privacy of client data used to train the ML models. Privacy is preserved because client-specific data (e.g., the first client data 150 and the second client data 152) is not shared between the server 102, the first client device 140, and the second client device 142. Although the output data (e.g., the first output data 160 and the second output data 162) and gradient data (e.g., the first gradient data 170 and the second gradient data 172) may be shared between the server 102 and the respective client device, such data is not shared with other client devices nor is such data able to be processed to construct the client-specific data by another entity. Thus, privacy of sensitive client data is preserved while enabling computing resource-intensive training to be offloaded to the server 102 (or one or more cloud-based processing systems) that may have significantly more computing resources than the client devices 140 and 142. Additionally, the system 100 may be more flexible than typical federated learning systems because different complexity partial ML models may be provided to different client devices. This enables the system 100 to more efficiently use distributed computing resources and may result in more robust ML models. For example, different structured partial ML models may be provided to different clients to more efficiently use available computing resources at the respective client devices or to enable training of more robust ML models based on varying amounts of client data.

Unlike in split learning, in some implementations of the system 100, all clients (e.g., Hospitals, Internet of Medical Things (IoMTs) with low computing resources, or the like) may carry out the forward propagations on their client-side model in parallel, then pass their smashed data to the (main) server. Then the server, which has sufficient computing resources (e.g., cloud server and researchers with high-performance computing resources), may process the forward propagation and back-propagation on its server-side model with each client's smashed data in parallel, or partially concurrently. The server may then send the gradients of the smashed data (i.e., activations' gradients) to the respective clients for their back-propagation. Afterward, the server may update its model by a weighted average of the gradients that it computes during the back-propagation on each client's smashed data. At the client's side, after receiving the gradients of the smashed data, each client may perform the back-propagation on their client-side local model and compute its gradients. Then, the clients may send the gradients back to the server, which may conduct the federated averaging of the client-side local updates and send the results back to all participating clients. This way, the server may synchronize the client-side global model in each round of network training. The server's computations may not be costly, and the server may be hosted within the local edge boundaries. Although some implementations described herein are for the label sharing configuration, any possible configurations of split learning, including U-shaped without label sharing, vertically partitioned data, extended vanilla, and multi-task split-learning can be implemented by the system 100.

In Federated Averaging (FedAvg), a particular federated learning algorithm, the local surrogate of the global objective function at device k is Fk, and the local solver is stochastic gradient descent (SGD), with the same learning rate and number of local epochs used on each device. At each round, a subset k of the total N devices are selected and run SGD locally for E number of epochs, and then the resulting model updates are averaged. The details of FedAvg are summarized in Algorithm 1 below.

---
Algorithm 1 - Federated Averaging (FedAvg) Training Algorithm

Input: K, T, E, $w^0$, N, $p_k$, k = 1, 2, ..., N
for t = 0, 1, ..., T − 1 do
    Server selects a subset $S_t$ of K devices at random (each device k is chosen with probability $p_k$)
    Server sends $w^t$ to all chosen devices
    Each device k ∈ $S_t$ updates $w^t$ for E epochs of SGD on $F_k$ with stepsize to obtain $w_k^{t+1}$
    Each device k ∈ $S_t$ sends $w_k^{t+1}$ back to the server
    Server aggregates the w's as $w^{t+1} = \frac{1}{K}\sum_{k \in S_t} w_k^{t+1}$
end for

---

It has been shown that tuning the optimization hyperparameters of FedAvg properly can be critical to performance. In particular, the number of local epochs in FedAvg plays an important role in convergence. On one hand, performing more local epochs allows for more local computation and potentially reduced communication, which can greatly improve the overall convergence speed in communication constrained networks. On the other hand, with dissimilar (heterogeneous) local objectives Fk, a larger number of local epochs may lead each device towards the optima of its local objective as opposed to the global objective—potentially hurting convergence or even causing the method to diverge. Further, in federated networks with heterogeneous systems resources, setting the number of local epochs to be high may increase the risk that devices do not complete training within a given communication round and must therefore drop out of the procedure.

According to some aspects, the cooperative learning performed by the system 100 improves upon federated learning by including client-specific, dynamic model splitting in addition to cross-client model aggregations. In some implementations, a training algorithm for the system 100 may begin by defining n data owners FN, all of whom wish to train a machine-learning model by consolidating their respective data $d_1, \ldots d_n$. A typical method is to combine all the data together and use $D = d_1 \cup d_2 \cup \ldots \cup d_n$ to train a model $M_{sum}$. A federated-learning system is a learning process in which the data owners collaboratively train a model $M_{fed}$, in which process any data owner F does not expose its data F to others. In addition, the accuracy of $F_{fed}$, denoted as $L_{fed}$, should be very close to the performance of $M_{sum}$, $L_{sum}$.

For the considered heterogeneous model of data distribution, solving Equation 1 may not be the ideal choice as it returns a single model that even after a few steps of local gradient may not quickly adjust to each users local data. On the other hand, by solving Equation 2 below, an initial model (Meta-model) may be found by the system 100 which is trained in a way that after one step of local gradient leads to a good model for each individual user. This formulation can also be extended to the case that users run a few steps of gradient update, but to simplify the notation, the single gradient update case is focused on to seek a provably convergent method for the case that the functions f are nonconvex.

$$\min_{x \in R^d} f(x) = \sum_{i=1}^{n} f_i(x_i, d_i, c_i) * p_i \text{ subject to}$$ Equation 2

$$\sum_{i=1}^{n} p_i, x_1 \neq x_2 \neq \ldots \neq x_n$$

In order to improve model convergence during training at multiple clients, the system 100 may be configured to train an ML model by splitting the ML model into multiple client-specific partial ML models, cooperatively training multiple client-specific models with the client devices, and aggregating the resulting ML models to construct a final output model, as described above with reference to FIG. 1. In some implementations, the system 100 may be configured to perform such training according to Algorithm 2 below.

---
Algorithm 2 - Cooperative Learning Training Algorithm

Input: k, N, T, $M_t^g$
ServerExecutes:
    Initialize the global model $W_t^g$ with $W_0^g$
    Randomly select k clients from N
    $W_{k,t}^s, W_{k,t}^c \leftarrow$ SplitModel($W_t^g$)
    {$W_{k,t}^s$ for server and $W_{k,t}^c$ for each client k}
    for each round t = 1, 2, ... do
        for each client in k clients in parallel do
            $W_{k,t+1}^s, W_{k,t+1}^c \leftarrow$ ClientUpdate($W_{k,t}^s, W_{k,t}^c$)
        end for
        $W_{t+1}^g \leftarrow$ AggregateModels($W_{k,t+1}^s, W_{k,t+1}^c$)
    end for
ClientUpdate($W_{k,t}^s, W_{k,t}^c$):
    Forward propagation with $W_{k,t}^c$ and get gradients $G_{k,t}^f$
    Send forward gradients $G_{k,t}^f$ to server
    Forward propagation with $W_{k,t}^s$ and calculate loss $L_{k,t}$
    Back propagation with $L_{k,t}$ and update $W_{k,t}^s$
    Send back propagation gradients $G_{k,t}^b$ to client
    Back propagation with $G_{k,t}^b$ and update $W_{k,t}^c$

---

Although the cooperative learning described above implements a privacy-infused architecture, an investigation of its performance under strict privacy configurations with differential privacy is useful. In some architectures described herein, the clients communicate with the server in two stages: (1) the split model training and (2) the model aggregation. The clients share their smashed data (e.g., activations) from their split layer (e.g., cut layer) to the main server, and the server aggregates the client-side model portions. During both of these communications, the clients do not share their raw data with the server or other clients. This inherently maintains privacy. However, there can be an advanced adversary exploiting the underlying information representations of the shared smashed data or parameters (e.g., weights) to violate data owners' privacy. This can happen if the data communications between the clients and the servers get breached, or any server becomes vulnerable or malicious. To avoid this possibility (i.e., potential privacy leakage), dynamic model splitting may be applied. As described above, the clients and the server may collaboratively train the client-side model portion and the server-side model portion separately while training one whole model that is split between the clients and the main server. Thus, the application of the dynamic model splitting on the client-side model guarantees a differentially private client-side model training that is independent of the server-side model training.

In some implementations, the system 100 may split ML models for the clients based on resources at available at the clients. For example, the system 100 may split a first ML model for a first client associated with first resources in a different manner than for a second client associated with different resources. As such, in some implementations, the system 100 may be configured to perform resource-efficient model splitting on a client-by-client basis. In some such implementations, the system 100 may split an ML model for a client CR according to Algorithm 3 below.

---
Algorithm 3 - Resource-Efficient Model Splitting Algorithm
---

```
Input: k, N, T, clientCR
SplitModel(W_t^g):
    for client index i = 1, 2, ..., k do
        currentCR = FLOPS for client data loading
        for each layer w ∈ W_t^g do
            if currentCR + layerCR < clientCR then
                add layer parameters w to W_{i,t}^c
            end if
        end for
        split the server model portion W_{i,t}^s = W_t^g − W_{i,t}^c
    end for
```

Additionally or alternatively, the system 100 may be configured to split ML models for clients to reduce loss functions. The loss function for a model (e.g., an NN) may be a combination of two losses of log of distance correlation (DCOR) and categorical cross entropy (CCE) used before and after split layer, respectively. DCOR is a measure of nonlinear (and linear) statistical dependence, and the log of DCOR between the raw data and activations at the split layer during the training of the network may be reduced. Reducing DCOR between the raw data and the activations at the split later may prevent the propagation of information that is not necessary to the final learning task of a model, as further described herein. The CCE may be optimized between predicted labels and ground-truth for classification by the appropriate selection of split point (e.g., partitioning) among the layers of the NN for dividing the NN into partial ML models to be trained by the server 102 and the respective client device. In some implementations, reducing the DCOR and optimizing the CCE may be performed based on Kullback-Leibler divergence, as further described herein.

In some implementations, the system 100 may be configured to split ML models between the server 102 and clients to preserve data privacy. As explained above, different partition points (e.g., different splitting) of the same DNN topology result in different computation offloading, communication latency, and resource usage in a client-server or edge-cloud collaboration system. To illustrate, in an edge-cloud collaborative inference system, a DNN is partitioned into two parts: $f_\theta = f_{\theta 1} \cdot f_{\theta 2}$. Each part contains several layers. The edge device hosts the first part $f_{\theta 1}$. The edge device collects inference data from the environment, generates the intermediate value $v = f_{\theta 1}(x)$, and sends it to the cloud. The cloud hosts the second part of the model $f_{\theta 2}$. When receiving the intermediate value v from the edge device, the cloud calculates the final output $\gamma = f_{\theta 1}(v)$ and returns it to the edge device. The partition may be analyzed based on latency, power, computation capability, memory usage, model accuracy, and input data privacy. Latency: An optimal partition should give the fastest inference speed. The latency may be determined as a combination of the inference time on the edge device, the inference time in the cloud (e.g., on the server), and the network transmission time. The cloud can process the inference at a much faster speed, so it may be preferable to move more DNN layers to the cloud. However, this movement can cause larger volumes of transmitted data and longer network latency. So the performance of edge devices, cloud servers, and network transmission should be balanced. Power: An optimal partition should be energy efficient. This may be particularly important for edge devices that have limited power capabilities. The energy consumed by the edge device may consist of the inference computation (determined by the number of layers) and network communication (determined by the size of transmitted data). Similar to latency optimization, the energy consumption of these two parts should be balanced. Computation capability: An optimal partition should offload the intensive computation to the cloud (e.g., server) based on the computation capability on the edge side. For many edge devices, the computation capability (e.g., floating-point operations per second (FLOPS)) depends on power consumption, which can also be considered in practice. Memory Usage: When conducting inference, the edge device hosts the first portion of the DNN in the memory and completes the partial model inference. For some edge devices, the model deployment capability is constrained by lack of memory resources, as well as the specific DNN topology since the memory requirements vary for different layer types. Model Accuracy: An optimal partition should not reduce the model performance. This is particularly important for edge devices on which are to balance the model accuracy and data privacy. The model accuracy describes the percentage of correct predictions made when deploying the split model and running inference for test data. An objective of at least one aspect described herein is to improve data privacy without reducing the model performance. Input Data Privacy: An optimal partition should provide the best privacy protection. The risk of input data reconstruction determines the data privacy during the inference process on the edge device, the cloud, and the intermediate data exchanges in communications between the edge device and the cloud. It is assumed that the edge device is secure, but the cloud may not be trustworthy in at least some practical deployment scenarios. Thus, it may be preferable to measure the privacy leakage in the edge-cloud collaboration quantitatively.

With the considerations of latency and computation offloading, DNN partitioning is usually formulated as an optimization problem. In a detailed study of latency and power consumption in a typical edge-cloud collaborative system, an AlexNet model was deployed between a mobile device and a cloud connected by WiFi. It was observed that with an optimal split point, an edge-cloud system can achieve lower latency and energy than a cloud-only or an edge-only system. These results are logically supported, as by offloading some DNN layers to the cloud, the processing time and energy consumed on the edge device is less than in the edge-only system. Additionally, as the size of the intermediate data is smaller than the original input, the latency and energy costs of network transmission in the edge-cloud system are also less than the cloud-only system.

While some partitioning of DNNs focuses on improving end-to-end latency, reducing energy consumption, and accelerating the inference, in some implementations DNN partitioning may focus on the data privacy preserving of different partition points. To illustrate, the system 100 may support an adaptive partition ML framework that automatically splits DNN computation between edge/client devices and the cloud/the server 102 for the purpose of minimizing the privacy leakage in edge-cloud or client-server collaboration. For example, a DNN may be split at different partition points, and the privacy leakage and preservation for these partition points may be studied in addition to the computation and memory usage of each layer in the DNN's topology. In such implementations, the model splitter 114 may evaluate and determine the partition point of the DNN model, or other type of ML model, that achieves the best privacy preserving under the constraints of limited memory and computational resources for an edge device, without sacrificing the model accuracy. In practical deployment, the system 100 may adapt to various DNN architectures, application privacy requirements and hardware platforms, allowing computation offloading to be combined with privacy protection, unlike in other model splitting techniques. In some implementations, the model splitter 114 may be configured to split ML models, such as DNNs, between the server 102 and a client device using an illustrative privacy-aware model partitioning under resource constraints algorithm shown in Algorithm 4 below.

---

Algorithm 4 - Privacy-Aware Model Partitioning Under Resource Constraints

---

Input:
DNN model $f_\theta$ with N layers; layer information $\{L_i | i = 1 \ldots N\}$;
Hardware specification of target platform: memory $M_{platform}$ and computation power $C_{platform}$
Output:
Best Partition Point BestPoint 1: function PERLAYERANALYSIS($f_\theta$)
2:    for each i ∈ 1, 2, ... , N do
3:       $LC_i \leftarrow$ GETFLOPS($L_i$)    ▯Calculate layer computation cost
4:       $LM_i \leftarrow$ GETMEMORYSIZE($L_i$)    ▯Calculate layer memory usage
5:       $C_{edge} = \Sigma_{j-1}^{i} LC_i$    ▯Calculate total computation cost on edge
6:       $M_{edge} = \Sigma_{j-1}^{i} LM_i$    ▯Calculate total memory usage on edge
7:       if $C_{edge} < C_{platform}$ AND $M_{edge} < M_{platform}$ then    ▯check platform
8:          ValidPartitions $\leftarrow$ APPEND(i)    ▯Collect all valid split points
9:    return ValidPartitions
10: function PARTITIONDECISION($f_\theta$)    ▯Main function
11:    PartitionPoints $\leftarrow$ PERLAYERANALYSIS($f_\theta$)
12:    Initialize PL,ACC lists    ▯PL: privacy leakage, ACC: inference accuracy
13:    for each k ∈ PartitionPoints do    ▯Split model for every valid condition
14:       $f_{\theta 1}, f_{\theta 2} \leftarrow$ SPLITMODEL($f_\theta$, k)    ▯Deploy partial models respectively
15:       $PL_k \leftarrow$ PRIVACYMEASURE($f_{\theta 1}$)    ▯Minimize privacy leakage in training
16:       $ACC_k \leftarrow$ GETACCURACY($f_{\theta 1}, f_{\theta 2}$)    ▯Measure the inference accuracy
17:    BestPoint $\leftarrow$ FINDMINMAX(PL,ACC)    ▯Determine best split point
18:    return BestPoint

---

The model partitioning strategy in accordance with Algorithm 4 is privacy-aware since different split points have different effectiveness of preserving data privacy. Unlike performing adaptive partitioning by calculating the privacy only on the inference stages, aspects described herein integrate the privacy measurement into the training process. Integrating the privacy measurement into the training process may constantly reduce privacy leakage (e.g., over one or more epochs). Thus, aspects described herein may achieve the best available privacy protection of inference data and high model accuracy due to the DNN model parameters being updated not only based on the prediction results but also based on the data privacy measurement. As such, the layers in the network are divided across the distributed entities based on the split layer, which is determined in a privacy-aware manner. The correlation between raw input and smashed data (e.g., data generated from training the distributed partial models) may be reduced by adding a regularization during the training of the distributed model in split learning. In particular, DCOR, a measure of non-linear (and linear) statistical dependence, may be used and the log of DCOR between the raw data and activations at the split layer during the training of the network may be reduced. This regularization aims at preventing the propagation of information that is not necessary to the final learning task of the model from the private data to the smashed data. Intuitively, this is supposed to hamper the reconstruction of X an adversary that has access to the smashed data. For the model portion on the server side, the CCE may be optimized between predicted labels and ground-truth for classification. The loss function for the network is a combination of two losses of log of DCOR and CCE used before and after split layer, respectively.

In some implementations, Kullback-Leibler divergence is used as a measure of invertibility of the smashed data. A connection may be derived between distance covariance DCOV, (X,Z) which is an unnormalized version of distance correlation and information-theoretic measures of Kullback-Leibler divergence (KLD) and cross-entropy H. In some implementations, the sample statistic of distance covariance can be written in terms of covariance matrices COV(X), COV(Z), where X, Z are mean centered, as in Equation 3 below.

$$DCOV(X,Z) = n^2 Tr(Cov(X) \cdot Cov(Z)) \quad \text{Equation 3}$$

During the split learning protocol, the distributed model may be trained to jointly minimize the loss function shown in Equation 4 below.

$$IL_{total} = \alpha_1 DCOR(X, f_{\theta 1}(X)) + \alpha_2 \cdot IL_{task}(\gamma, f_{\theta 2}(X)) \quad \text{Equation 4}$$

where DCOR is the distance correlation metrics, $IL_{task}$ is the task loss of the distributed model (e.g., cross-entropy for a classification task), and γ is a suitable label for the target task (if any). In Equation 4, the hyper-parameters $\alpha_1$ and $\alpha_2$ define the relevance of distance correlation in the final loss function, creating and managing a tradeoff between data privacy (i.e., how much information an attacker can recover from the smashed data) and the model's utility on the target task (e.g., the accuracy of the model in a classification task). It is noted that the distance correlation loss depends on only the client's network $f_{\theta 1}$ and the private data X. Thus, the distance correlation can be computed using Equation 4 and applied locally on the client-side without any influence from the server. In this manner, the distance correlation for privacy-preserving DNN, or other ML model, splits may be determined in order to identify model splits that optimize data privacy or that achieve a target data privacy.

Figure 2:
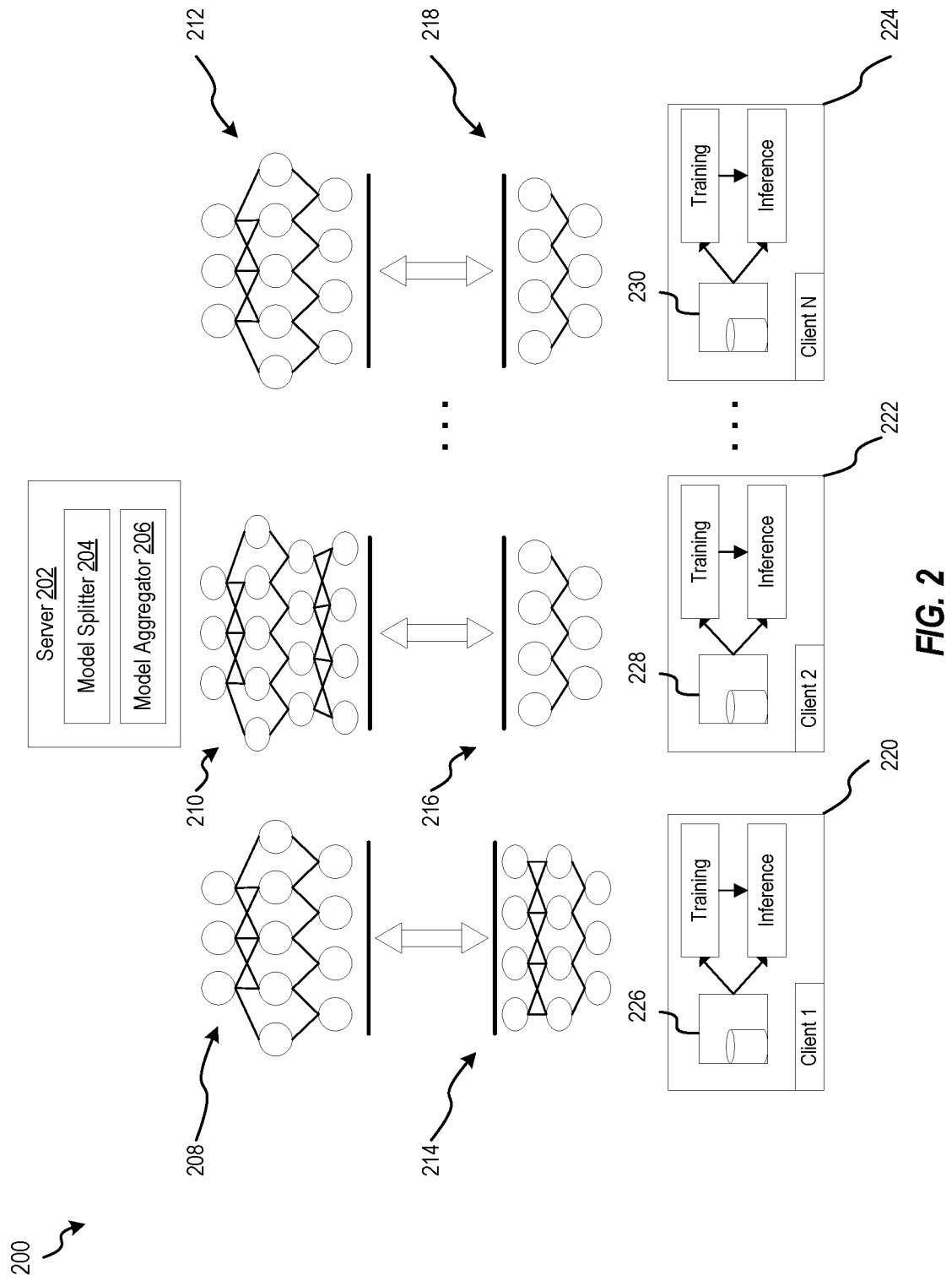
FIG. 2 is a block diagram of another example of a system that supports cooperative training of ML models that preserves privacy according to one or more aspects.

Referring to FIG. 2, an example of a system that supports cooperative training of ML models that preserves privacy according to one or more aspects is shown as a system 200. In some implementations, the system 200 of FIG. 2 may include or correspond to the system 100 of FIG. 1 (or components thereof). As shown in FIG. 2, the system 200 includes a server 202, multiple partial ML models 208, 210, 212, 214, 216, and 218, a first client device 220, a second client device 222, and an Nth client device 224. Although three client devices and corresponding pairs of partial ML models are shown in FIG. 2, in other implementations the system 200 may include fewer than three or more than three client devices and corresponding pairs of partial ML models.

The server 202 includes a model splitter 204 and a model aggregator 206. The model splitter may be configured to "split" one or more ML models into multiple partial ML models. For example, the model splitter 204 may split a first ML model into partial ML model 208 and partial ML model 214 (e.g., a first pair of partial ML models that correspond to the first client device 220). As another example, the model splitter 204 may split a second ML model into partial ML model 210 and partial ML model 216 (e.g., a second pair of partial ML models that correspond to the second client device 222). As yet another example, the model splitter 204 may split a third ML model into partial ML model 212 and partial ML model 218 (e.g., an Nth pair of partial ML models that correspond to the Nth client device 224). Although FIG. 2 shows splitting an initial ML model into two partial ML models, in other implementations, the model splitter 204 may split initial ML models into more than two partial ML models. The partial ML models 214, 216, and 218 may be referred to as client-side partial ML models, and each of the partial ML models 214, 216, and 218 may be configured to be trained at the client devices 220, 222, and 224, respectively. The partial ML models 208, 210, and 212 may be referred to as server-side partial ML models, and each of the partial ML models 208, 210, and 212 may be configured to be trained at the server 202.

Each of the partial ML models 208-218 may be represented by a corresponding parameter set that indicates values of one or more structural parameters of the respective partial ML model. The structural parameters may include a number of layers, a number of hidden layers, a number of nodes per layer or per type of layer, a number of input nodes, a number of output nodes, a number of hidden nodes, a number of connections per node, weights of connections, activation functions associated with nodes, or the like. Splitting an ML model may result in two parameter sets corresponding to two partial ML models that, when combined, can reconstruct a parameter set corresponding to the original ML model.

As shown in FIG. 2, a client-side partial ML model and a server-side partial model split from the same initial model may have different sizes and/or structures. As an example, although partial ML model 214 and partial ML model 208 each include three layers (e.g., each have relatively the same size), the structure of partial ML model 214 is different than the structure of partial ML model 208, such as each layer of partial ML model 214 having a different number of nodes than the corresponding layer of partial ML model 208 (e.g., the first layers include three and four nodes, respectively, the second layers include four and five nodes, respectively, and the third layers include four and three nodes, respectively). The split of the first ML model that results in partial ML models 214 and 208 may be based on client information, as described above with reference to FIG. 1, such as computing resources available at the first client device 220, a relative size of client data accessible to the first client device 220, or the like. As a particular example, the first ML model may be split according to Algorithm 3. Alternatively, the split of the first ML model that results in partial ML models 214 and 208 may be based on achieving a maximum (e.g., optimal) or target data privacy for the client devices. As a particular example, the first ML model may be split according to Algorithm 4.

In some implementations, the model splitter 204 may split the initial ML model in the same manner for each client, such that each client-side partial ML model has the same size and structure as partial ML model 214, and each server-side partial ML model has the same size and structure as partial ML model 208. Alternatively, the model splitter 204 may split the initial ML model differently for one or more clients than for one or more other clients. In the example of FIG. 2, the model splitter 204 splits the initial ML model different for the first client and the second client. In this manner, client-side partial ML models may have different sizes or structures for different clients. For example, partial ML model 214 includes three layers and partial ML model 216 includes two layers. Additionally, server-side partial ML models may have different sizes or structures for two different clients. For example, partial ML model 208 includes three layers and partial ML model 210 includes four layers. Additionally or alternatively, the model splitter 204 may prune one or more nodes or layers or otherwise modify the structure of the initial ML model during splitting, such that a combination of the partial ML models associated with one client may have a different size or structure than a combination of partial ML models associated a different client. For example, partial ML model 218 may have the same number of layers and structure of nodes as partial ML model 216, but partial ML model 212 may not have the same number of layers or structure of nodes as partial ML model 210. Additionally, partial ML model 212 may have the same number of layers and structure of nodes as partial ML model 208, but partial ML model 218 may not have the same number of layers or structure of nodes as partial ML model 214. It should be appreciated that the partial ML models shown in FIG. 2 are illustrative examples, and in other implementations, the various ML models may have different numbers of layers, numbers of nodes, structures, and the like. One of skill in the art will understand that many arrangements are possible with varying parameters being both the same or different between multiple client-side partial ML models, between multiple server-side partial ML models, and between client-side partial ML models and server-side partial ML models.

After the model splitter 204 splits the initial ML model into the partial ML models 208-218, server 202 may provide the client-side partial ML models to the respective client devices 220-224 for training. Each of the client devices 220-224 may train a partial ML model based on individual client data (e.g., private client-specific data) to perform one or more inferences. For example, the first client device 220 may train partial ML model 214 based on client data 226, which may be private, confidential, or the like with respect to the first client. Similarly, second client device 222 may train partial ML model 216 based on client data 228, and the Nth client device 224 may train partial ML model 218 based on client data 230. During training at the client devices 220, 222, and 224, output data that is generated may be shared with the server 202 for use in training the server-side partial ML models. For example, the server 202 may train the partial ML models 208, 210, and 212 based on output data received from the client devices 220, 222, and 224, respectively. For example, the server 202 may train partial ML model 208 based on output data received from the first client device 220 during training of partial ML model 214. Similarly, the server 202 may train partial ML model 210 based on output data received from the second client device 222 during training of partial ML model 216, and the server 202 may train partial ML model 212 based on output data received from the Nth client device 224 during training of partial ML model 218. In some implementations, the training may include backpropagation and sharing of gradient data from the server 202 to the client devices 220, 222, and 224, as described above with reference to FIG. 1.

After partial ML models 208-218 are trained, the model aggregator 206 may aggregate multiple partial ML models to construct an aggregated ML model. For example, the model aggregator 206 may aggregate partial ML models 208-212 to construct an aggregate server-side partial ML model, the model aggregator 206 may aggregate partial ML model 214-218 to construct an aggregate client-side partial ML model, and the aggregate server-side partial ML model may be combined with the aggregate client-side partial ML model to construct an aggregate ML model. Alternatively, each pair of client-side and server-side partial ML models may be combined, and the model aggregator 206 may aggregate the combined ML models to construct the aggregate ML model. Aggregating may include averaging, weighted averaging, or other forms of combining structural parameter values from multiple ML models (or partial ML models), as described above with reference to FIG. 1. In some implementations, prior to aggregation, multiple ML models (or partial ML models) may be converted to a common format, such as a common number of layers, number of nodes per layer, etc., as described above with reference to FIG. 1. Thus, the system 200 enables cooperative training of ML models (e.g., an aggregate ML model) by the server 202 and the client devices 220, 222, and 224 that offloads computer-resource intensive training operations from the client devices 220, 222, and 224 to the server 202 and that preserves privacy (e.g., client data 226-230 is not shared with other entities) in an untrusted environment.

Figure 3:
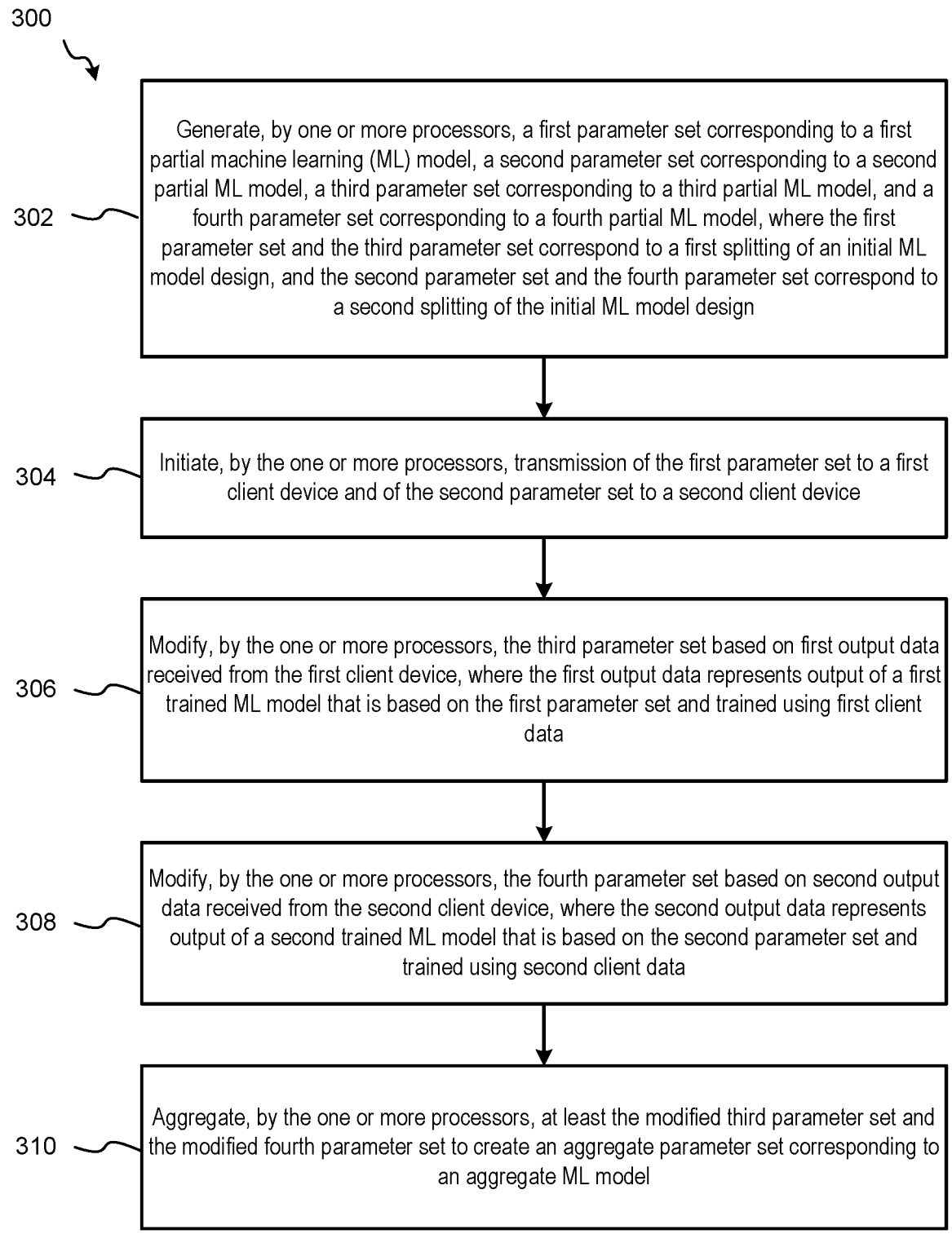
FIG. 3 is a flow diagram illustrating an example of a method for cooperative training of ML models according to one or more aspects.

Referring to FIG. 3, a flow diagram of an example of a method for cooperative training of ML models according to one or more aspects is shown as a method 300. In some implementations, the operations of the method 300 may be stored as instructions that, when executed by one or more processors (e.g., the one or more processors of a computing device or a server), cause the one or more processors to perform the operations of the method 300. In some implementations, the method 300 may be performed by a computing device, such as the server 102 of FIG. 1 (e.g., a computing device configured for managing cooperative training of ML models in an untrusted environment), the server 202 of FIG. 2, or a combination thereof.

The method 300 includes generating a first parameter set corresponding to a first partial ML model, a second parameter set corresponding to a second partial ML model, a third parameter set corresponding to a third partial ML model, and a fourth parameter set corresponding to a fourth partial ML model, at 302. For example, the first parameter set may include or correspond to the first parameter set 116 of FIG. 1, the second parameter set may include or correspond to the second parameter set 118 of FIG. 1, the third parameter set may include or correspond to the third parameter set 120 of FIG. 1, and the fourth parameter set may include or correspond to the fourth parameter set 122 of FIG. 1. The first parameter set and the third parameter set correspond to a first splitting of an initial ML model design, and the second parameter set and the fourth parameter set correspond to a second splitting of the initial ML model design. For example, the initial ML model design may include or correspond to the initial ML model parameters 111 of FIG. 1.

The method 300 includes initiating transmission of the first parameter set to a first client device and of the second parameter set to a second client device, at 304. For example, the first client device may include or correspond to the first client device 140 of FIG. 1 and the second client device may include or correspond to the second client device 142 of FIG. 1. The method 300 includes modifying the third parameter set based on first output data received from the first client device, at 306. For example, the first output data may include or correspond to the first output data 160 of FIG. 1. The first output data represents output of a first trained ML model that is based on the first parameter set and trained using first client data. For example, the first client device 140 of FIG. 1 may implement and train a partial ML model based on the first parameter set 116.

The method 300 includes modifying the fourth parameter set based on second output data received from the second client device, at 308. For example, the second output data may include or correspond to the second output data 162 of FIG. 1. The second output data represents output of a second trained ML model that is based on the second parameter set and trained using second client data. For example, the second client device 142 of FIG. 1 may implement and train a partial ML model based on the second parameter set 118. The method 300 includes aggregating at least the modified third parameter set and the modified fourth parameter set to create an aggregate parameter set corresponding to an aggregate ML model, at 310. For example, the aggregate parameter set may include or correspond to the aggregate ML model parameters 180 of FIG. 1.

In some implementations, a structure of the first partial ML model is different from a structure of the second partial ML model. For example, the first partial ML model may include or correspond to the partial ML model 214 of FIG. 2 and the second partial ML model may include or correspond to the partial ML model 216 of FIG. 2, which have a different structure (e.g., a different number of layers). In some such implementations, the structure of the first partial ML model and the structure of the second partial ML model include a number of layers associated with the respective partial ML model, a number of nodes per layer associated with the respective partial ML model, or a combination thereof.

In some implementations, a structure of the first partial ML model is the same as a structure of the second partial ML model. For example, the first partial ML model may include or correspond to the partial ML model 216 of FIG. 2 and the second partial ML model may include or correspond to the partial ML model 218 of FIG. 2, which have the same structure (e.g., the same number of layers and structure of nodes). Alternatively, a structure of the third partial ML model may be different than a structure of the first partial ML model, a structure of the second partial ML model may be different than a structure of the fourth partial ML model, or a combination thereof. For example, the first partial ML model may include or correspond to the partial ML model 214 of FIG. 2, the second partial ML model may include or correspond to the partial ML model 216 of FIG. 2, the third partial ML model may include or correspond to the partial ML model 208 of FIG. 2, and the fourth partial ML model may include or correspond to the partial ML model 210 of FIG. 2. Additionally or alternatively, the first splitting of the initial ML model design may be based on first privacy leakage and preservation corresponding to the first client device, and the second splitting of the initial ML model design may be based on second privacy leakage and preservation corresponding to the second client device. For example, the initial ML model design may be split according to Algorithm 4 based on calculations from the respective client device.

In some implementations, modifying the third parameter set includes providing the first output data as training data to the third partial ML model. For example, the first output data may include or correspond to the first output data 160 of FIG. 1. In some such implementations, the method 300 further includes determining first gradient data based on output of the third partial ML model during training and initiating transmission of the first gradient data to the first client device. For example, the first gradient data may include or correspond to the first gradient data 170 of FIG. 1. In some such implementations, the method 300 includes receiving additional output data from the first client device. In some such implementations, the method 300 includes providing the additional output data as further training data to the third partial ML model. Additionally or alternatively, modifying the fourth parameter set may include providing the second output data as training data to the fourth partial ML model. For example, the second output data may include or correspond to the second output data 162 of FIG. 1. In some such implementations, the method 300 may include initiating transmission of second gradient data to the second client device. For example, the second gradient data may include or correspond to the second gradient data 172 of FIG. 1. The second gradient data is based on output of the fourth partial ML model during training. In some such implementations, the method 300 may include providing second additional output data as further training data to the fourth partial ML model. The second additional output data is received from the second client device and represents output of the second trained ML model based on the second gradient data.

In some implementations, aggregating the modified third parameter set and the modified fourth parameter set includes averaging one or more structural parameter values corresponding to the modified third parameter set and one or more structural parameter values corresponding to the modified fourth parameter set. For example, the model aggregator 124 of FIG. 1 may be configured to average the one or more structural parameter values of the modified third parameter set 120 and the modified fourth parameter set 122. Additionally or alternatively, aggregating the modified third parameter set and the modified fourth parameter set may include weighting one or more structural parameter values corresponding to the modified third parameter set, weighting one or more structural parameter values corresponding to the modified fourth parameter set, and averaging the one or more weighted structural parameter values corresponding to the modified third parameter set and the one or more weighted structural parameter values corresponding to the modified fourth parameter set. For example, the weighting may include or correspond to the weights 126 of FIG. 1 and the model aggregator 124 of FIG. 1 may be configured to average the one or more weighted structural parameter values of the modified third parameter set 120 and the modified fourth parameter set 122. In some such implementations, weights associated with the one or more weighted structural parameter values corresponding to the modified third parameter set are based on a data size of the first client data, an amount of resources associated with the first client device, a priority associated with the first client device, or a combination thereof. For example, the data size, the amount of resources, and the priority may be indicated by the client information 110 of FIG. 1.

In some implementations, the method 300 includes initiating deployment of the aggregate parameter set to one or more client devices for creation of one or more ML models at the one or more client devices. For example, the aggregate parameter set may include or correspond to the aggregate ML model parameters 180 of FIG. 1. Additionally or alternatively, the method 300 includes obtaining input data corresponding to a task to be performed by an ML model corresponding to the aggregate parameter set. In some such implementations, the method 300 includes providing the input data to the ML model to generate a predicted output. In some such implementation, the method 300 also includes initiating performance of one or more actions based on the predicted output.

As described above, the method 300 supports cooperative training of ML models and efficient use of available computing resources at multiple devices while preserving privacy of client data used to train the ML models. Thus, the method 300 provides a scalable, privacy-preserving method for cooperative learning that preserves privacy in an untrusted environment, as compared to conventional split-learning or federated learning techniques.

Figure 4:
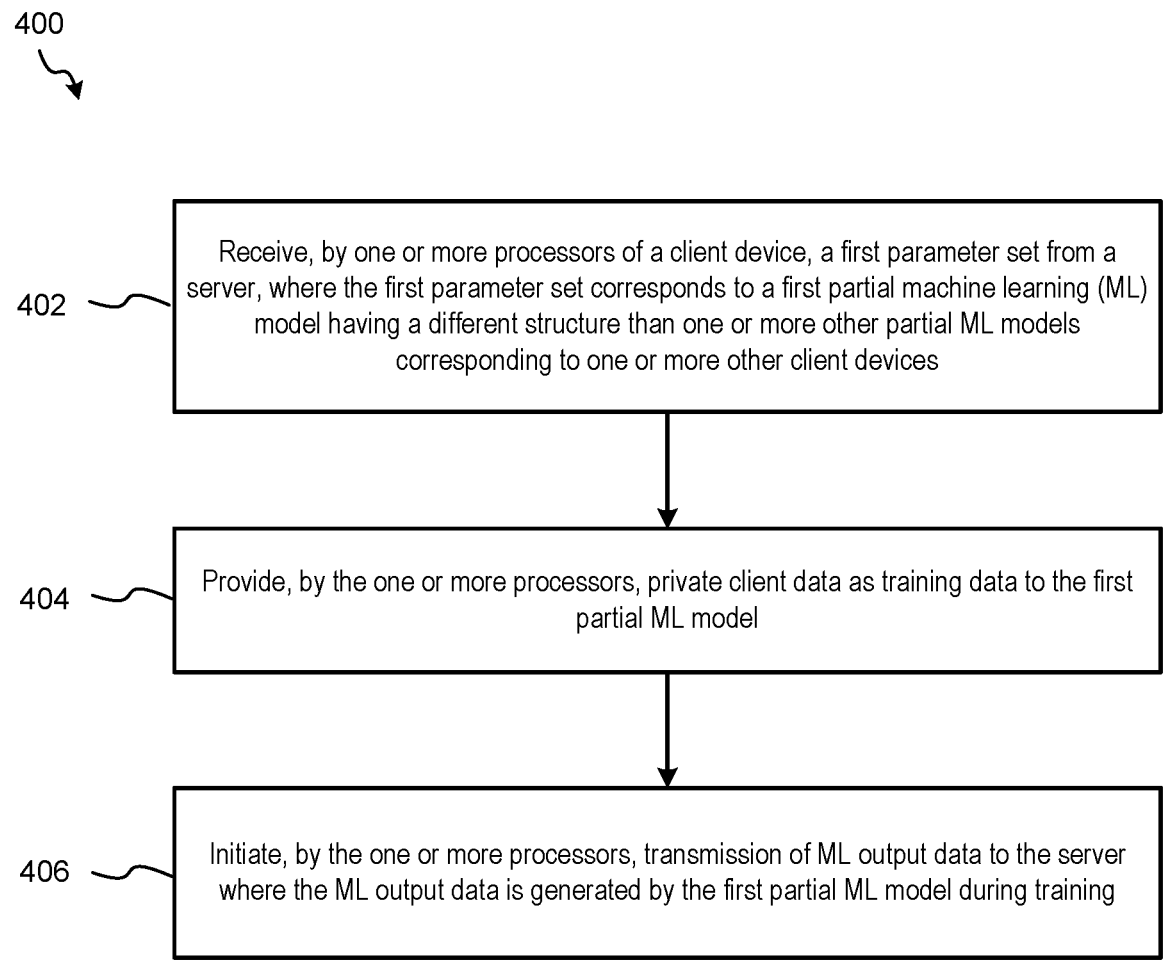
FIG. 4 is a flow diagram illustrating an example of a method for training a partial ML model using private client data according to one or more aspects.

Referring to FIG. 4, a flow diagram of an example of a method for training a partial ML model using private client data according to one or more aspects is shown as a method 400. In some implementations, the operations of the method 400 may be stored as instructions that, when executed by one or more processors (e.g., the one or more processors of a computing device or a client device), cause the one or more processors to perform the operations of the method 400. In some implementations, the method 400 may be performed by a computing device, such as the first client device 140 of FIG. 1 (e.g., a computing device configured for receiving partial ML model(s) for training as part of cooperative ML model training in an untrusted environment), the first client device 220 of FIG. 2, or a combination thereof.

The method 400 includes receiving a first parameter set from a server, at 402. For example, the first parameter set may include or correspond to the first parameter set 116 of FIG. 1. The first parameter set corresponds to a first partial ML model having a different structure than one or more other partial ML models corresponding to one or more other client devices. For example, the first partial ML model may correspond to the first parameter set 116 of FIG. 1, and the one or more other partial ML models may include or correspond to the second parameter set 118 of FIG. 1. The method 400 includes providing private client data as training data to the first partial ML model, at 404. For example, the private client training data may include or correspond to the first client data 150 in FIG. 1. The method 400 includes initiating transmission of ML output data to the server, at 406. The ML output data is generated by the first partial ML model during training. For example, the ML output data may include or correspond to the first output data 160 of FIG. 1.

In some implementations, the method 400 may further include receiving gradient data from the server and using the gradient data to train the first partial ML model. For example, the gradient data may include or correspond to the first gradient data 170 of FIG. 1. Any additional output data generated during training of the first partial ML model may also be provided with the server for training a corresponding partial ML model at the server.

As described above, the method 400 supports cooperative training of ML models and efficient use of available computing resources at multiple devices while preserving privacy of client data used to train the ML models. Thus, the method 400 provides a scalable, privacy-preserving method for cooperative learning that preserves privacy in an untrusted environment, as compared to conventional split-learning or federated learning techniques.

In some aspects, the above-described techniques may be utilized to enable cooperative training of ML models for automating, or partially automating, useful operations in a variety of industries, such as manufacturing, computer technology, medical technology, network service providers, and others. An illustrative use case includes training ML models to perform predictive maintenance. For example, a manufacturer of aircraft engines may operate the server 102 of FIG. 1 to train ML models to implement predictive maintenance, such as by generating alerts or initiating maintenance actions when a problem is predicted to occur for an airline engine. In such an example, the clients may include various commercial airlines that use engines from the manufacturer in their aircraft. In this use case, operational data, such as engine usage history, sensor readings, and the like, from the various commercial airlines is useful as training data to train an ML model to predict maintenance issues based on a variety of conditions experienced by the various engines. However, the commercial airlines may not be interested in sharing their operation data with other airlines, which are competitors, or even with the engine manufacturer. Because the systems and techniques described herein preserve the privacy of client data, the commercial airlines are more likely to participate in the cooperative training because their operational data is not shared with other entities, and they benefit from a robust ML-based predictive maintenance system.

Another illustrative use case includes training ML models to perform human activity recognition. For example, a manufacturer of smart devices (e.g., smartphones, wearable devices, etc.) may operate the server 102 of FIG. 1 to train ML models to recognize human activity and perform different operations based on different activities and/or to provide health information relative to an individual user's condition. In such an example, the clients may include personal users that use smart devices from the manufacturer. In this use case, personal health data, such as sensor readings from the smart devices, location information, and the like, from the individual users is useful as training data to train an ML model to recognize activity of the user or health conditions of the user. However, the individual users may not be interested in sharing their personal data with others, or with a company. Because the systems and techniques described herein preserve the privacy of client data, the users are more likely to participate in the cooperative training because their persona data is not shared with the manufacturer or other users, and they benefit from a robust ML-based predictive maintenance system. Additionally, most of the computing resource-intensive training may be offloaded from the smart devices to the server, further benefitting the individual users.

It is noted that other types of devices and functionality may be provided according to aspects of the present disclosure and discussion of specific devices and functionality herein have been provided for purposes of illustration, rather than by way of limitation. It is noted that the operations of the method 300 of FIG. 3 and the method 400 of FIG. 4 may be performed in any order, or that operations of one method may be performed during performance of another method, such as the method 400 of FIG. 4 including one or more operations of the method 300 of FIG. 3. It is also noted that the method 300 of FIG. 3 and the method 400 of FIG. 4 may also include other functionality or operations consistent with the description of the operations of the system 100 of FIG. 1 or the system 200 of FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-4) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for cooperative training of machine learning models, the method comprising:
    generating, by one or more processors, a first parameter set corresponding to a first partial machine learning (ML) model, a second parameter set corresponding to a second partial ML model, a third parameter set corresponding to a third partial ML model, and a fourth parameter set corresponding to a fourth partial ML model,
        wherein the first parameter set and the third parameter set correspond to a first splitting of an initial ML model design, and the second parameter set and the fourth parameter set correspond to a second splitting of the initial ML model design;
    initiating, by the one or more processors, transmission of the first parameter set to a first client device and of the second parameter set to a second client device;
    modifying, by the one or more processors, the third parameter set based on first output data received from the first client device,
        wherein the first output data represents output of a first trained ML model that is based on the first parameter set and trained using first client data;
    modifying, by the one or more processors, the fourth parameter set based on second output data received from the second client device,
        wherein the second output data represents output of a second trained ML model that is based on the second parameter set and trained using second client data; and
    aggregating, by the one or more processors, at least the modified third parameter set and the modified fourth parameter set to create an aggregate parameter set corresponding to an aggregate ML model.

2. The method of claim 1, wherein:
    a structure of the first partial ML model is different from a structure of the second partial ML model; and
    the structure of the first partial ML model and the structure of the second partial ML model include a number of layers associated with the respective partial ML model, a number of nodes per layer associated with the respective partial ML model, or a combination thereof.

3. The method of claim 1, wherein a structure of the first partial ML model is the same as a structure of the second partial ML model.

4. The method of claim 1, wherein:
    the first splitting of the initial ML model design is based on first privacy leakage and preservation corresponding to the first client device; and
    the second splitting of the initial ML model design is based on second privacy leakage and preservation corresponding to the second client device.

5. The method of claim 1, wherein a structure of the third partial ML model is different than a structure of the first partial ML model, a structure of the second partial ML model is different than a structure of the fourth partial ML model, or a combination thereof.

6. The method of claim 1, wherein modifying the third parameter set comprises:
    providing, by the one or more processors, the first output data as training data to the third partial ML model.

7. The method of claim 6, further comprising:
    determining, by the one or more processors, first gradient data based on output of the third partial ML model during training; and
    initiating, by the one or more processors, transmission of the first gradient data to the first client device.

8. The method of claim 6, further comprising:
    receiving, by the one or more processors, additional output data from the first client device,
        wherein the additional output data represents output of the first trained ML model based on the first gradient data; and
    providing, by the one or more processors, the additional output data as further training data to the third partial ML model.

9. The method of claim 6, wherein modifying the fourth parameter set comprises:
    providing, by the one or more processors, the second output data as training data to the fourth partial ML model.

10. The method of claim 9, further comprising:
    initiating, by the one or more processors, transmission of second gradient data to the second client device,
        wherein the second gradient data is based on output of the fourth partial ML model during training; and
    providing, by the one or more processors, second additional output data as further training data to the fourth partial ML model,
        wherein the second additional output data is received from the second client device and representing output of the second trained ML model based on the second gradient data.

11. The method of claim 1, wherein aggregating the modified third parameter set and the modified fourth parameter set comprises averaging one or more structural feature values corresponding to the modified third parameter set and one or more structural parameter values corresponding to the modified fourth parameter set.

12. The method of claim 1, wherein aggregating the modified third parameter set and the modified fourth parameter set comprises:
    weighting one or more structural feature values corresponding to the modified third parameter set;
    weighting one or more structural parameter values corresponding to the modified fourth parameter set; and
    averaging the one or more weighted structural feature values corresponding to the modified third parameter set and the one or more weighted structural feature values corresponding to the modified fourth parameter set.

13. The method of claim 12, wherein weights associated with the one or more weighted structural feature values corresponding to the modified third parameter set are based on a data size of the first client data, an amount of resources associated with the first client device, a priority associated with the first client device, or a combination thereof.

14. The method of claim 1, further comprising initiating, by the one or more processors, deployment of the aggregate parameter set to one or more client devices for creation of one or more ML models at the one or more client devices.

15. The method of claim 1, further comprising:
obtaining, by the one or more processors, input data corresponding to a task to be performed by an ML model corresponding to the aggregate parameter set;
providing, by the one or more processors, the input data to the ML model to generate a predicted output; and
initiating, by the one or more processors, performance of one or more actions based on the predicted output.

16. A system for cooperative training of machine learning models, the system comprising:
a memory; and
one or more processors communicatively coupled to the memory, the one or more processors configured to:
generate a first parameter set corresponding to a first partial machine learning (ML) model, a second parameter set corresponding to a second partial ML model, a third parameter set corresponding to a third partial ML model, and a fourth parameter set corresponding to a fourth partial ML model,
wherein the first parameter set and the third parameter set correspond to a first splitting of an initial ML model design, and the second parameter set and the fourth parameter set correspond to a second splitting of the initial ML model design;
initiate transmission of the first parameter set to a first client device and of the second parameter set to a second client device;
modify the third parameter set based on first output data received from the first client device,
wherein the first output data represents output of a first trained ML model that is based on the first parameter set and trained using first client data;
modify the fourth parameter set based on second output data received from the second client device,
wherein the second output data represents output of a second trained ML model that is based on the second parameter set and trained using second client data; and
aggregate at least the modified third parameter set and the modified fourth parameter set to create an aggregate parameter set corresponding to an aggregate ML model.

17. The system of claim 16, wherein:
a first structural parameter associated the first partial ML model has a different value than a first structural parameter associated with the second partial ML model; and
the first structural parameter comprises a number of layers, a number of nodes in a particular layer, a number of hidden layers, a number of input nodes, a number of output nodes, a number of connections per node, or one or more weights.

18. The system of claim 16, wherein the aggregate ML model represents a combination of an aggregation of the third partial ML model and the fourth partial ML model and an aggregation of the first partial ML model and the second partial ML model.

19. A non-transitory computer-readable storage medium storing instructions that, when executed by one or more processors, cause the one or more processors to perform operations for cooperative training of machine learning models, the operations comprising:
generating a first parameter set corresponding to a first partial machine learning (ML) model, a second parameter set corresponding to a second partial ML model, a third parameter set corresponding to a third partial ML model, and a fourth parameter set corresponding to a fourth partial ML model,
wherein the first parameter set and the third parameter set correspond to a first splitting of an initial ML model design, and the second parameter set and the fourth parameter set correspond to a second splitting of the initial ML model design;
initiating transmission of the first parameter set to a first client device and of the second parameter set to a second client device;
modifying the third parameter set based on first output data received from the first client device,
wherein the first output data represents output of a first trained ML model that is based on the first parameter set and trained using first client data;
modifying the fourth parameter set based on second output data received from the second client device,
wherein the second output data represents output of a second trained ML model that is based on the second parameter set and trained using second client data; and
aggregating at least the modified third parameter set and the modified fourth parameter set to create an aggregate parameter set corresponding to an aggregate ML model.

20. The non-transitory computer-readable storage medium of claim 19, wherein the operations further comprise, prior to aggregating the modified third parameter set and the modified fourth parameter set, converting the modified third parameter set and the modified fourth parameter set to a common format.

* * * * *